US012168632B2

(12) United States Patent
D'Evelyn et al.

(10) Patent No.: US 12,168,632 B2
(45) Date of Patent: Dec. 17, 2024

(54) ALUMINUM-CONTAINING NITRIDE CERAMIC MATRIX COMPOSITE, METHOD OF MAKING, AND METHOD OF USE

(71) Applicant: SLT Technologies, Inc., Los Angeles, CA (US)

(72) Inventors: Mark P. D'Evelyn, Vancouver, WA (US); David N. Italiano, Washougal, WA (US)

(73) Assignee: SLT Technologies, Inc., Los Angeles, CA (US)

( * ) Notice: Subject to any disclaimer, the term of this patent is extended or adjusted under 35 U.S.C. 154(b) by 126 days.

(21) Appl. No.: 17/963,910

(22) Filed: Oct. 11, 2022

(65) Prior Publication Data

US 2023/0111390 A1 Apr. 13, 2023

Related U.S. Application Data

(60) Provisional application No. 63/254,937, filed on Oct. 12, 2021.

(51) Int. Cl.
*C04B 35/581* (2006.01)
*C04B 35/626* (2006.01)
(Continued)

(52) U.S. Cl.
CPC ...... *C04B 35/581* (2013.01); *C04B 35/62695* (2013.01); *C04B 35/645* (2013.01);
(Continued)

(58) Field of Classification Search
CPC .......................................................... B32B 3/02
See application file for complete search history.

(56) References Cited

U.S. PATENT DOCUMENTS 3,101,259 A 8/1963 Sawyer
4,300,979 A 11/1981 Kolb et al.
(Continued)

OTHER PUBLICATIONS

PCT/US2022/077922, International Search Report and Written Opinion dated Jan. 3, 2024, 9 pages.

*Primary Examiner* — Emmanuel S Luk
(74) *Attorney, Agent, or Firm* — Patterson + Sheridan, LLP

(57) ABSTRACT

Embodiments of disclosure may provide a method for forming an aluminum-containing nitride ceramic matrix composite, comprising heating a green body, an aluminum-containing composition, ammonia and a mineralizer composition in a sealable container to a temperature between about 400 degrees Celsius and about 800 degrees Celsius and a pressure between about 10 MPa and about 1000 MPa, to form an aluminum-containing nitride ceramic matrix composite characterized by a phosphor-to-aluminum nitride (AlN) ratio, by volume, between about 1% and about 99%, by a porosity between about 1% and about 50%, and by a thermal conductivity between about 1 watt per meter-Kelvin and about 320 watts per meter-Kelvin. The green body comprises a phosphor powder comprising at least one phosphor composition, wherein the phosphor powder particles are characterized by a D50 diameter between about 100 nanometers and about 500 micrometers, and the green body has a porosity between about 10% and about 80%. The aluminum-containing composition has a purity, on a metals basis, between about 90% and about 99.9999%. The fraction of free volume within the sealable container contains between about 10% and about 95% of liquid ammonia prior to heating the green body, the aluminum-containing composition, ammonia and the mineralizer composition in the sealable container.

20 Claims, 12 Drawing Sheets

(51) Int. Cl.
  *C04B 35/645* (2006.01)
  *C04B 35/65* (2006.01)
  *C09K 11/02* (2006.01)
  *C09K 11/77* (2006.01)
  *B28B 1/30* (2006.01)
  *B28B 3/02* (2006.01)

(52) U.S. Cl.
  CPC .............. *C04B 35/65* (2013.01); *C09K 11/02* (2013.01); *C09K 11/77348* (2021.01); *B28B 1/30* (2013.01); *B28B 3/02* (2013.01); *C04B 2235/3865* (2013.01); *C04B 2235/3869* (2013.01); *C04B 2235/402* (2013.01); *C04B 2235/5427* (2013.01); *C04B 2235/5436* (2013.01); *C04B 2235/5445* (2013.01); *C04B 2235/656* (2013.01)

(56) References Cited

U.S. PATENT DOCUMENTS

| | | | |
|---|---|---|---|
| 2011/0316040 A1 | 12/2011 | Hirotsuru et al. | |
| 2012/0137966 A1* | 6/2012 | D'Evelyn | C30B 7/105 |
| | | | 117/224 |
| 2019/0309221 A1* | 10/2019 | Ooguri | C09K 11/7792 |
| 2021/0017087 A1 | 1/2021 | Naruse | |

\* cited by examiner

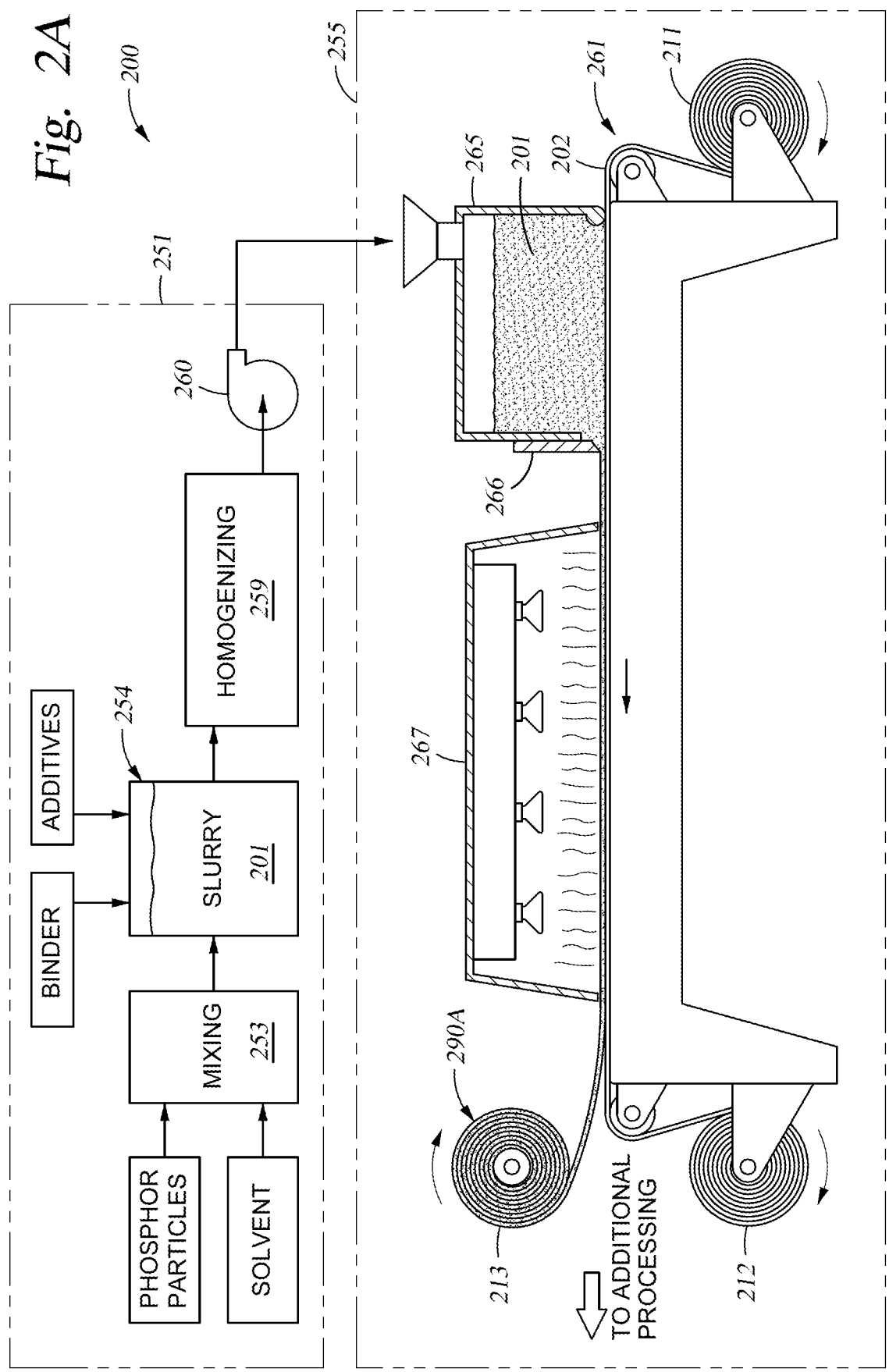

ALUMINUM-CONTAINING NITRIDE CERAMIC MATRIX COMPOSITE, METHOD OF MAKING, AND METHOD OF USE

CROSS REFERENCE TO RELATED APPLICATIONS

This application claims the benefit of U.S. provisional patent application Ser. No. 63/254,937, filed Oct. 12, 2021, which is herein incorporated by reference.

BACKGROUND

Field

This disclosure relates generally to techniques for processing materials for manufacture of polycrystalline ceramic composites, including aluminum-containing nitride matrix composites. More specifically, embodiments of the disclosure include techniques for fabricating ceramic matrix composites incorporating one or more phosphor compositions in an aluminum-containing nitride matrix using a combination of processing techniques. Such ceramic matrix composites can be used for a variety of applications, including phosphor members for intense light sources such as laser diodes, and others.

Description of the Related Art

Solid state lighting has grown tremendously during the past two decades and is widely applied in many residential, commercial, and industrial settings. Typically, light from a blue and/or violet excitation source, for example, emitted by a light emitting diode (LED) is absorbed by one or more phosphor compositions, which in turn emit blue, green, yellow, and/or red light, resulting in white light overall, whose color temperature and other characteristics, such as the color rendition index (CRI), can be controlled. More recently, laser diodes have been used as excitation sources, which offer the advantages of extremely high brightness and luminance and capability for very narrow beam angles, longer throw distances, and higher contrast. However, in order to fully realize the advantages of laser-based lighting, phosphor compositions with very high thermal conductivity are required, so that the heat generated by light conversion processes within the phosphor can be carried away without degrading the performance of the phosphor or of the package. With LEDs, phosphors are commonly dispersed in silicones, epoxies, or other polymer compositions that have very low thermal conductivities. A number of groups have demonstrated phosphor-in-glass (PiG) compositions with good phosphor performance, but the thermal conductivity of these compositions is still quite low.

A ceramic phosphor composition would be ideal for laser-based lighting, at least in principle. Ideally, it would have a high thermal conductivity and a high internal and external quantum efficiency. However, currently, Ce-doped yttrium aluminum garnet (YAG:$Ce^{+3}$), which emits yellow light, is the only ceramic phosphor composition that is widely available commercially, and blue+YAG white light has a low CRI. Several groups have demonstrated other phosphor compositions in ceramic form, where sintering and densification have been achieved by conventional methods such as hot pressing, hot isostatic pressing, and spark plasma sintering. However, the high temperatures associated with these conventional ceramic processing methods often degrade the performance of the phosphor. In addition, for a number of applications it would be desirable to have multiple phosphor compositions, such as a green phosphor and a red phosphor, in close proximity to one another, and co-sintering involves additional challenges over and above sintering of a simple composition. The use of a matrix can potentially overcome some of the difficulties in co-sintering, but the matrix materials that have been demonstrated to date have important limitations with respect to the optical and thermal properties of the resulting ceramic matrix composite.

Due to at least the issues described above, there is a need for a phosphor-containing ceramic matrix composite that has excellent phosphor performance and a high thermal conductivity.

BRIEF SUMMARY OF THE DISCLOSURE

According to the present disclosure, further techniques related to techniques for processing materials for manufacture of aluminum-containing ceramic matrix composites are provided. More specifically, embodiments of the disclosure include Embodiments of the disclosure may also provide a method for forming an aluminum-containing nitride ceramic matrix composite. The method can include: forming at least one green body comprising a phosphor powder and an aluminum-containing composition, wherein the at least one green body is characterized by a porosity between about 10% and about 80%; and heating a sealable container to a temperature between about 400 degrees Celsius and about 800 degrees Celsius and a pressure between about 10 MPa and about 1000 MPa. At least one green body, ammonia, and a mineralizer composition are disposed within the sealable container before heating and pressurizing the sealable container. The phosphor powder comprises at least one phosphor composition, the phosphor powder particles having a D50 diameter between about 100 nanometers and about 500 micrometers. The aluminum-containing composition has a purity, on a metals basis, between about 90% and about 99.9999%. The fraction of free volume within the sealable container that is filled with liquid ammonia is between about 10% and about 95% before heating and pressurizing the sealable container. The heating the sealable container comprises heating the sealable container for a first period of time to form an aluminum-containing nitride ceramic matrix composite characterized by a phosphor-to-AlN ratio, by volume, between about 1% and about 99%, by a porosity between about 1% and about 50%, and by a thermal conductivity between about 1 watt per meter-Kelvin and about 320 watts per meter-Kelvin.

Embodiments of the disclosure may also provide an aluminum-containing composition. The aluminum-containing composition includes an aluminum-containing nitride matrix material and a plurality of secondary ceramic phase particles. The plurality of secondary ceramic phase particles are characterized by a particle size distribution having a D10 value between about 1 micrometer and about 10 micrometers and a D90 value between about 10 micrometers and about 100 micrometers. The aluminum-containing composition also includes: at least 50% of boundaries of the plurality of secondary ceramic phase particles bonded to the aluminum-containing matrix material; a ratio of the plurality of secondary ceramic phase particles to aluminum-containing matrix material between about 1% and about 99%; and the aluminum-containing composition is characterized by a porosity between about 1% and about 50% and by a thermal conductivity between about 1 watt per meter-Kelvin and about 320 watts per meter-Kelvin. The plurality of secondary ceramic phase particles can also include at least one phosphor composition. The plurality of secondary ceramic phase particles can also include at least two phosphor compositions. In some embodiments, the aluminum-containing composition can also be characterized by a ratio of the plurality of secondary ceramic phase particles to aluminum-containing matrix material between about 5% and about 95%, by a porosity between about 2% and about 50%, and by a thermal conductivity between about 5 watts per meter-Kelvin and about 260 watts per meter-Kelvin. The phosphor composition can also comprise at least one of $Y_3Al_5O_{12}:Ce^{3+}$, $Lu_3Al_5O_{12}:Ce^{3+}$, $(Y,Gd,Tb,Sc,Lu,La)_3(Al,Ga,In)_5O_{12}:Ce^{3+}$, $\beta$-SiAlON:$Eu^{2+}$, $\alpha$-SiAlON:$Eu^{2+}$, and $CaAlSiN_3:Eu^{2+}$. In some embodiments, a secondary electron micrograph of a polished section of the aluminum-containing composition reveals no observable gaps within at least 50% of boundaries between the plurality of secondary ceramic phase particles and the aluminum-containing matrix material.

A further understanding of the nature and advantages of the present disclosure may be realized by reference to the specification and attached drawings.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

FIG. 2A is a simplified diagram showing a process flow for tape casting a slurry composition according to an embodiment of the present disclosure.

Figure 1A:
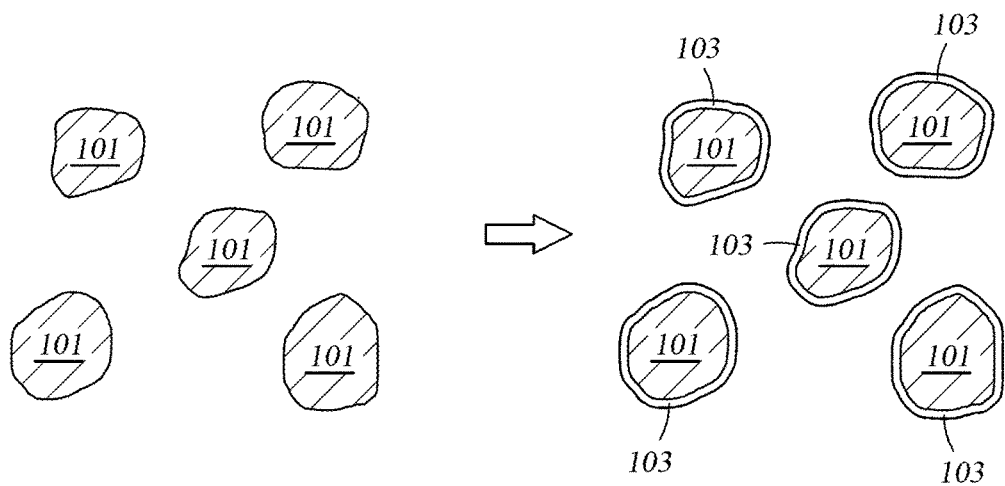
FIG. 1A is a simplified diagram showing a plurality of phosphor particles with a coating according to an embodiment of the present disclosure.

To facilitate understanding, identical reference numerals have been used, where possible, to designate identical elements that are common to the figures. It is contemplated that elements and features of one implementation may be beneficially incorporated in other implementations without further recitation.

DETAILED DESCRIPTION OF THE DISCLOSURE

According to the present disclosure, techniques related to techniques for processing materials for manufacture of aluminum-containing nitride ceramic matrix composites are provided. The aluminum-containing nitride ceramic matrix composite combines the functionality of incorporated particles, such as phosphor particles, with translucent optical properties and a high thermal conductivity.

Figure 1B:
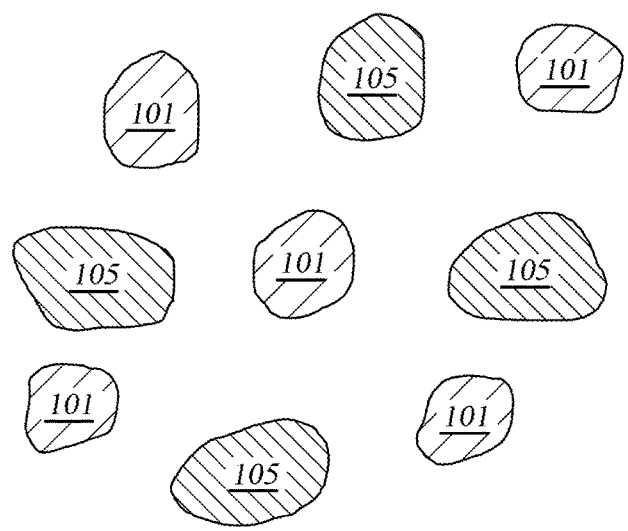
FIG. 1B is a simplified diagram showing a mixture of phosphor particles and aluminum-containing particles.

FIGS. 1A and 1B are schematic cross-sectional views illustrating a process step within a fabrication method of an aluminum-containing nitride ceramic matrix composite that overcomes the limitations described above. Referring to FIGS. 1A and 1B, a plurality of phosphor particles 101 is provided. In certain embodiments, the phosphor particles 101 are selected from one or more compositions having emission wavelengths in the blue region (430-490 nm), the green region (490-560 nm), the yellow region (560-600 nm), or the red region (600-750 nm).

In a specific embodiment, the phosphor particles 101 include one or more material compositions that may include $Y_3Al_5O_{12}:Ce^{3+}$, $Lu_3Al_5O_{12}:Ce^{3+}$, $(Y,Gd,Tb,Sc,Lu,La)_3(Al,Ga,In)_5O_{12}:Ce^{3+}$, $\beta$-SiAlON:$Eu^{2+}$, $\alpha$-SiAlON:$Eu^{2+}$, $SrSi_2O_2N_2:Eu^{2+}$, $SrGa_2S_4:Eu^{2+}$, $SrS:Eu^{2+}$, and $CaAlSiN_3:Eu^{2+}$.

In certain embodiments, the plurality of phosphor particles 101 may include a phosphor capable of emitting substantially red light. Such a phosphor may be selected from material compositions that may include one or more of $CaAlSiN_3:Eu^{2+}$, $(Gd,Y,Lu, La)_2O_3:Eu^{3+}$, $Bi^{3+}$; $(Gd,Y,Lu, La)_2O_2S:Eu^{3+}$, $Bi^{3+}$; $(Gd,Y,Lu,La)VO_4:Eu^{3+}$, $Bi^{3+}$; $Y_2(O,S)_3:Eu^{3+}$; $Ca_{1-x}Mo_{1-y}Si_yO_4$: where $0.05 \leq x \leq 0.5$, $0 \leq y \leq 0.1$; $(Li,Na,K)_5Eu(W,Mo)O_4$; $(Ca,Sr)S:Eu^{2+}$; $SrY_2S_4:Eu^{2+}$; $CaLa_2S_4:Ce^{3+}$; $(Ca,Sr)S:Eu^{2+}$; $3.5MgO*0.5MgF_2*GeO_2:Mn^{4+}$(MFG); $(Ba,Sr,Ca)Mg_xP_2O_7:Eu^{2+}$, $Mn^{2+}$; $(Y,Lu)_2WO_6:Eu^{3+}$, $Mo^{6+}$; $(Ba,Sr,Ca)_3Mg_xSi_2O_8:Eu^{2+}$, $Mn^{2+}$, wherein $1<x\leq 2$; $(RE_{1-y}Ce_y)Mg_{2-x}Li_xSi_{3-x}PxO_{12}$, where RE is at least one of Sc, Lu, Gd, Y, and Tb, $0.0001<x<0.1$ and $0.001<y<0.1$; $(Y, Gd, Lu, La)_{2-x}Eu_xW_{1-y}Mo_yO_6$, where $0.5 \leq x \leq 1.0$, $0.01 \leq y \leq 1.0$; $(SrCa)_{1-x}Eu_xSi_5N_8$, where $0.01 \leq x \leq 0.3$; $SrZnO_2:Sm^{+3}$; $M_mO_nX$ wherein M is selected from the group of Sc, Y, a lanthanide, an alkali earth metal and mixtures thereof; X is a halogen; $1 \leq m \leq 3$; and $1 \leq n \leq 4$, and wherein the lanthanide doping level can range from 0.1 to 40% spectral weight; and $Eu^{3+}$ activated phosphate or borate phosphors; and mixtures thereof.

In certain embodiments, phosphor particles 101 include a blue phosphor composition including one or more of α-SiAlON:$Eu^{2+}$, $(Ba,Sr,Ca)_5(PO_4)_3(Cl,F\ Br,OH):Eu^{2+}$, $Mn^{2+}$; $Sb^{3+}$, $(Ba,Sr,Ca)MgAl_{10}O_{17}:Eu^{2+}$, $Mn^{2+}$; $(Ba,Sr,Ca)BPO_5$:$Eu^{2+}$, $Mn^{2+}$; $(Sr,Ca)_{10}(PO_4)_6*nB_2O_3:Eu^{2+}$; $2SrO*0.84P_2O_5*0.16B_2O_3:Eu^{2+}$; $Sr_2Si_3O_8*2SrCl_2:Eu^{2+}$; $(Ba,Sr,Ca)Mg_xP_2O_7:Eu^{2+}$, $Mn^{2+}$; $Sr_4Al_{14}O_{25}:Eu^{2+}$ (SAE); $BaAl_8O_{13}$:$Eu^{2+}$; and mixtures thereof.

In certain embodiments, phosphor particles 101 include a green phosphor composition including one or more of β-SiAlON:$Eu^{2+}$, $(Ba,Sr,Ca)MgAl_{10}O_{17}:Eu^{2+}$, $Mn^{2+}$ (BAMn); $(Ba,Sr,Ca)Al_2O_4:Eu^{2+}$; $(Y,Gd,Lu,Sc,La)BO_3$: $Ce^{3+},Tb^{3+}$; $Ca_8Mg(SiO_4)_4Cl_2:Eu^{2+}$, $Mn^{2+}$; $(Ba,Sr,Ca)_2SiO_4$:$Eu^{2+}$; $(Ba,Sr,Ca)_2(Mg,Zn)Si_2O_7:Eu^{2+}$; $(Sr,Ca,Ba)(Al,Ga,In)_2S_4:Eu^{2+}$; $(Y,Gd,Tb,La,Sm,Pr,Lu)_3(Al,Ga)_5O_{12}:Ce^{3+}$; $(Ca,Sr)_8(Mg,Zn)(SiO_4)_4Cl_2:Eu^{2+}$, $Mn^{2+}$(CASI); $Na_2Gd_2B_2O_7:Ce^{3+}$, $Tb^{3+}$; $(Ba,Sr)_2(Ca,Mg,Zn)B_2O_6:K,Ce,Tb$; and mixtures thereof.

In certain embodiments, phosphor particles 101 have a diameter or size between about 1 nanometer and about 1 millimeter, between about 100 nanometers and about 500 micrometers, between about 1 micrometer and about 200 micrometers, between about 1.5 micrometers and about 100 micrometers, or between about 2 micrometers and about 50 micrometers. Typically, the particles will not be spherical, and the term "diameter" as used herein refers to the diameter of a sphere having the same volume as that of the particle. In certain embodiments, phosphor particles 101 are characterized by a particle-size distribution having a D10 value between about 1 micrometer and about 10 micrometers and a D90 value between about 10 micrometers and about 100 micrometers. The particle-size distribution may be measured by various methods that are known in the art, such as laser diffraction, dynamic light scattering, dynamic image analysis, sieve analysis, optical counting, electroresistance counting, sedimentation, acoustic spectroscopy, laser obscuration time, or the like. Referring to the cumulative particle-size distribution, the quantities D10, D50, and D90 refer to the diameters at which 10% of the volume of particles, 50% of the volume of particles, or 90% of the volume of particles, respectively, have a diameter less or equal to than the specified value. In this terminology, the quantities we are calling D10, D50, and D90 are sometimes called Dv10, Dv50, and Dv90, respectively.

Referring again to FIG. 1A, in certain embodiments phosphor particles 101 may be coated with an aluminum-containing coating 103. In certain embodiments, aluminum-containing coating 103 has a thickness between about 10 nanometers and about 100 micrometers, between about 100 nanometers and about 25 micrometers, between about between about 150 nanometers and about 10 micrometers, or between about 0.25 micrometer and about 5 micrometers. In certain embodiments, aluminum-containing coating 103 is deposited by a physical vapor deposition (PVD) method such as thermal evaporation, e-beam evaporation, or sputtering. In certain embodiments, aluminum-containing coating 103 is deposited by chemical vapor deposition (CVD). In certain embodiments, aluminum-containing coating 103 also includes other components, such as a getter composition that includes one or more of beryllium, magnesium, calcium, strontium, barium, scandium, titanium, vanadium, chromium, yttrium, zirconium, niobium, the rare earth metals, hafnium, tantalum, and tungsten. In a specific embodiment, aluminum-containing coating 103 also includes one or more of beryllium, magnesium, scandium or yttrium. In this context, a getter refers to a composition with a higher affinity for oxygen than aluminum. Aluminum oxide form a highly stable, passivating film on the surface of aluminum metal that can be deleterious to the formation of aluminum nitride, and the presence of a getter can inhibit formation of aluminum oxide by preferentially bonding to the available oxygen and thus reducing the concentration of oxide that forms on the surface of the aluminum metal during processing. In preferred embodiments, the oxide of the getter material has a high thermal conductivity, with beryllium oxide being an outstanding example.

In certain embodiments, phosphor particles 101 are agitated while on a surface while aluminum-containing coating 103 is being deposited, for example, a vibratory table. In certain embodiments, phosphor particles 101 are in a fluidized bed while aluminum-containing coating 103 is being deposited. In certain embodiments, a nitrogen-containing gas is present during the deposition of aluminum-containing coating 103. In certain embodiments, the nitrogen-containing gas includes or consists of ammonia or $N_2$.

Referring again to FIG. 1B, in certain embodiments phosphor particles 101 are mixed with aluminum-containing particles 105. Mixing of the particles, which can be used to form an aluminum-containing green body that is discussed further below, may promote formation of an aluminum-containing nitride matrix, having a high thermal conductivity, around the phosphor particles. Aluminum-containing particles 105 may include or consist of aluminum nitride powder, aluminum nitride grit, aluminum powder, aluminum flakes, aluminum pellets, aluminum shavings, aluminum grit, aluminum evaporation slugs, or the like. Aluminum-containing particles 105 may have a minimum dimension between about 10 millimeters and about 1 micrometer, between about 5 millimeters and about 2 micrometers, between about 2 millimeters and about 5 micrometers, between about 1 millimeter and about 10 micrometers, or between about 500 micrometers and about 20 micrometers. Larger-sized aluminum-containing particles 105 may be more difficult to mix with phosphor particles 101 but may have advantages associated with a reduced oxygen content, which may enable higher thermal conductivity and improved translucency in the final ceramic matrix composite. The volume ratio of phosphor particles 101 to aluminum-containing particles 105 may be between about 1% and about 99%, between about 5% and about 95%, between about 10% and about 90%, or between about 20% and about 80%. In certain embodiments, phosphor particles 101 are mixed with aluminum-containing particles 105 in a ball mill, in an attrition mill, jet mill, or the like. In certain embodiments, milling media such as $Si_3N_4$, SiC, $ZrO_2$, or AlN, are present during the mixing operation and may be separated from the mixture when milling has been completed. In certain embodiments, the milling process is performed under an atmosphere of dry nitrogen. In certain embodiments, a shield gas is employed. In certain embodiments, the atmosphere present during the milling operation includes or consists of ammonia. During the milling process, mechanical bonding between at least a portion of phosphor particles 101 and aluminum-containing particles 105 may occur.

In certain embodiments, additional powder components are mixed with phosphor particles 101. In certain embodiments, a getter composition may be mixed with phosphor particles 101, for example, one or more of beryllium, magnesium, calcium, strontium, barium, scandium, titanium, vanadium, chromium, yttrium, zirconium, niobium, the rare earth metals, hafnium, tantalum, and tungsten, and their nitrides, oxynitrides, amides, imides, amido-imides, halides, or oxyhalides. In a specific embodiment, the getter composition includes one or more of beryllium, magnesium, scandium, and yttrium. In certain embodiments, the getter composition is included as an impurity in the aluminum-containing particles 105. In certain embodiments, aluminum-containing particles 105 include or consist of an alloy, with between about 0.1% and about 20% or between about 1% and about 10% of a getter composition and about between about 80% and about 99.9% or between about 90% and 99% of aluminum.

In certain embodiments, phosphor particles 101 are mixed and dispersed in a slurry 201 as part of a processing system 200, as shown schematically in FIG. 2A. The processing system 200 includes mixing components 251 and a green-body formation assembly 255. The mixing components 251 may mixing device 253, slurry tank 254, homogenizing device 259 and a pump 260. The green-body formation assembly 255 can include a carrier film feed assembly 261 with carrier film feed-reel 211, an input tank 265, doctor blade 266, heating device 267, green body take-up reel 213, and carrier film take-up reel 212. In some embodiments, the slurry includes water. In certain embodiments, the slurry includes a polar, aprotic solvent. In certain embodiments, the slurry is substantially free of water and includes an aliphatic solvent, such as diethylamine, or an aromatic solvent, such as aniline. Avoidance of water and protic solvents may be helpful in minimizing formation of $Al_2O_3$ and other oxides on the surfaces of phosphor particles 101, of aluminum-containing coatings 103, and of aluminum-containing particles 105, if present. In certain embodiments, the slurry includes one or more of a binder, lubricants, wetting agents, plasticizers, dispersants, deflocculants, other additives, and the like, as are known in the art. In certain embodiments, the slurry includes one or more of a wax composition and urea.

Organic binders which may be employed in manufacture of an aluminum-containing nitride ceramic matrix composite as components of the slurry or dry-mixed powder include but are not limited to vinyl polymers such as but not limited to polyvinyl butyral (PVB), polyvinyl alcohol (PVA), polyvinyl chloride (PVC), polyvinyl acetate (PVAc), polyacrylonitrile, mixtures thereof and copolymers thereof, polyethyleneimine, poly methyl methacrylate (PMMA), vinyl chloride-acetate and mixtures thereof, preferably PVB. Plasticizers which may be employed in manufacture of an aluminum-containing ceramic matrix composite include but are not limited to butylbenzyl phthalate, dicarboxylic/tricarboxylic ester-based plasticizers such as but not limited to phthalate-based plasticizers such as but not limited to bis (2-ethylhexyl) phthalate, diisononyl phthalate, bis(n-butyl) phthalate, butylbenzyl phthalate, diisodecyl phthalate, di-n-octyl phthalate, diisooctyl phthalate, diethyl phthalate, diisobutyl phthalate, di-n-hexyl phthalate and mixtures thereof adipate-based plasticizers such as but not limited to bis(2-ethylhexyl)adipate, dimethyl adipate, monomethyl adipate, dioctyladipate and mixtures thereof sebacate based plasticizers such as but not limited to dibutyl sebacate, and maleate type plasticizers such as but not limited to dibutyl maleate, diisobutyl maleate and mixtures thereof; polyalkylene glycols such as but not limited to polyethylene glycol, polypropylene glycol and mixtures thereof. Other plasticizers which may be used include but are not limited to benzoates; epoxidized vegetable oils; sulfonamides such as but not limited to N-ethyl toluene sulfonamide, N-(2-hydroxypropyl) benzene sulfonamide, and N-(n-butyl)benzene sulfonamide; organophosphates such as but not limited to tricresyl phosphate and tributyl phosphate; glycols/polyethers such as but not limited to triethylene glycol dihexanoate, tetraethylene glycol diheptanoate and mixtures thereof; alkyl citrates such as but not limited to triethylcitrate, acetyl triethylcitrate, tributylcitrate, acetyl tributyl citrate, trioctyl citrate, acetyltrioctyl citrate, trihexylcitrate, acetyl trihexylcitrate, butyryl trihexyl citrate, and trimethylcitrate; and alkyl sulphonic acid phenyl ester and mixtures thereof.

Dispersants which may be employed in formation of the slurry or dry-mixed powder include but are not limited to oxidized Menhaden fish oil (MFO), dicarboxylic acids such succinic acid, ethanedioic acid, propanedioic acid, pentanedioic acid, hexanedioic acid, heptanedioic acid, octanedioic acid, nonanedioic acid, decanedioic acid, sorbitan monooleate, o-phthalic acid, p-phthalic acid and mixtures thereof.

Figure 2B:
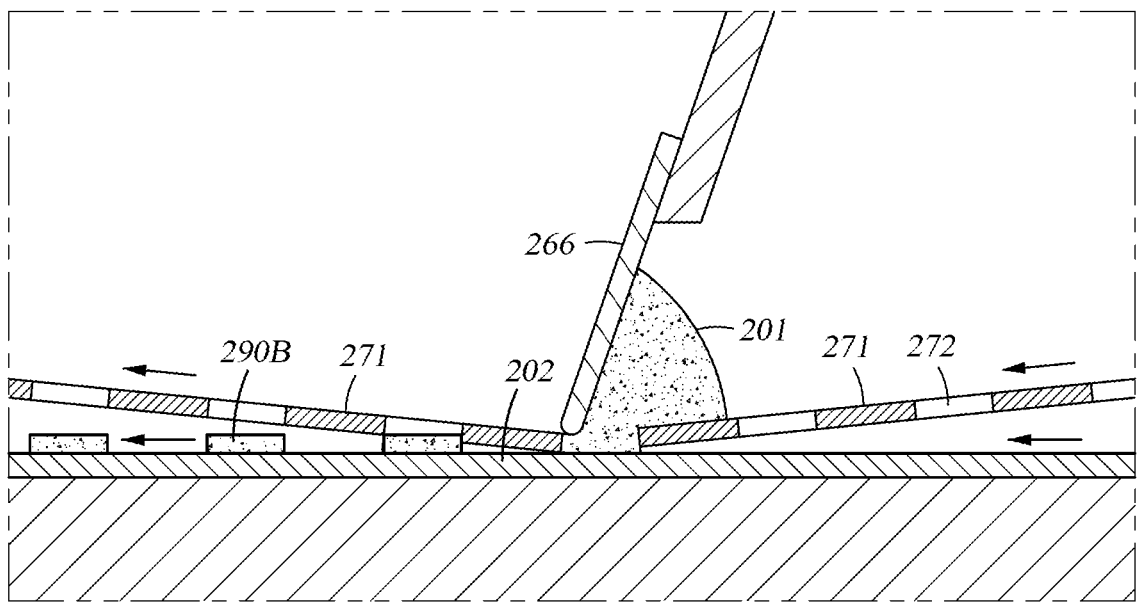
FIG. 2B is a simplified diagram showing a process flow for tape casting a slurry composition using a doctor blade and a stencil mask, according to an embodiment of the present disclosure.
Figure 2C:
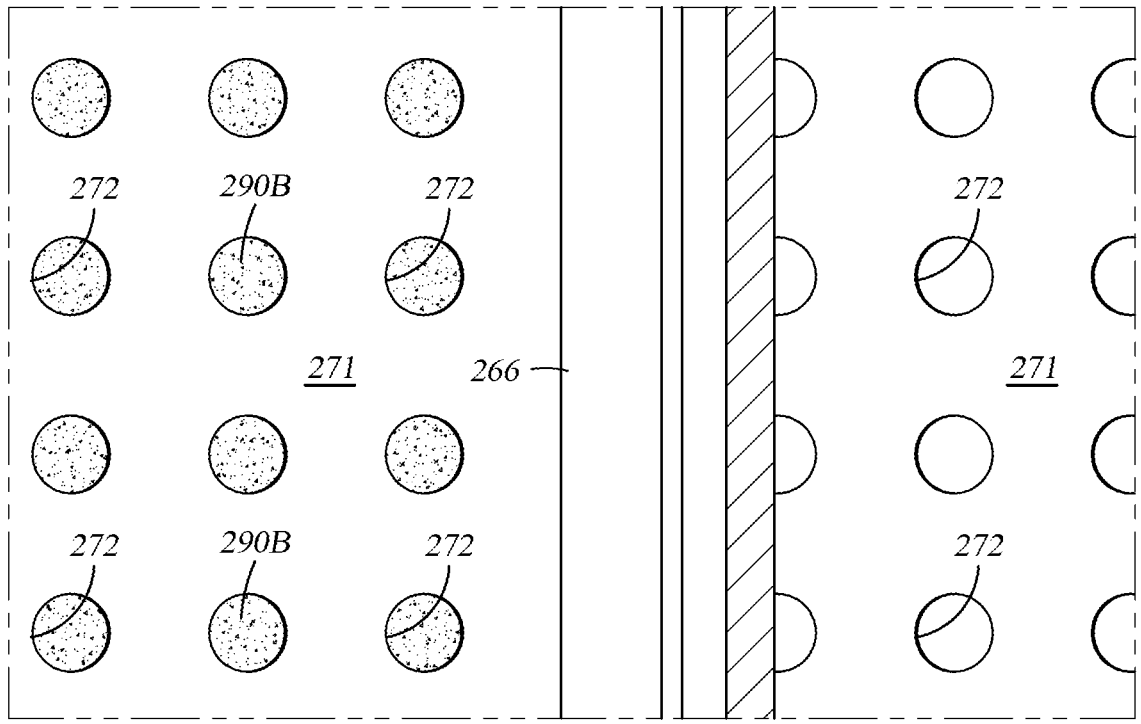
FIG. 2C is a plan view of the doctor blade portion and stencil mask portion of the tape casting device illustrated in FIG. 2A, according to an embodiment of the present disclosure.

In certain embodiments, as shown in FIGS. 2A, 2B, and 2C, the slurry 201 that includes phosphor particles 101 and/or aluminum-containing particles 105 is tape-cast onto a flexible carrier film using a tape casting or doctor blade technique to form a green body 290 on carrier film 202 by use of the components within the processing system 200. In one example, the green body 290 can be formed in either a continuous roll of material that is received on a take-up reel 213, which is referred to herein as a green body 290A, or as a plurality of green body disks 290B as shown in FIGS. 2B and 2C. The carrier film 202 is fed from a feed-reel 211 to a take-up reel 212 of the carrier film feed assembly 261. In certain embodiments, the carrier film 202 includes or consists of Mylar™. In certain embodiments, the carrier film 202 includes or consists of stainless steel or a metallic composition having a melting point above about 600 degrees Celsius or above about 660 degrees Celsius. In certain embodiments, the carrier film 202 includes an aluminum-containing foil or coating. In certain embodiments, the aluminum-containing foil or coating also includes a getter composition, at a concentration between about 0.1% and about 20% or between about 1% and about 10%.

In certain embodiments, the carrier film with an applied layer of slurry undergoes a drying process to form a green body 290. In certain embodiments, an aluminum-containing layer 303 is deposited on the carrier film 202 with an applied layer of slurry 302 that has been dried, as shown schematically in FIG. 3A. In certain embodiments, the dried slurry layer with an aluminum-containing coating 303 and/or including aluminum-containing particles 105 is heated to a temperature above 660 degrees Celsius, for example, to a temperature between about 660 degrees Celsius and about 900 degrees Celsius, or between about 675 degrees Celsius and about 750 degrees Celsius, causing the aluminum-containing layer 303 and/or aluminum-containing coating 103 and/or aluminum-containing particles 105 to melt and be drawn into and throughout the dried slurry layer by capillarity, forming an aluminum-containing coating 355 and aluminum-containing composite 359, as shown schematically in FIG. 3B. In certain embodiments, the melting and infiltration process is performed in vacuum, at a pressure below about $10^{-2}$ Torr, below about $10^{-3}$ Torr, below about $10^{-4}$ Torr, below about $10^{-5}$ Torr, below about $10^{-8}$ Torr, below about $10^{-7}$ Torr, or below about $10^{-8}$ Torr. In certain embodiments, the melting and infiltration process is performed under a nitrogen-containing atmosphere, such as $N_2$ or $NH_3$ or under an inert atmosphere, such as Ar, that is substantially free of oxygen and water. In certain embodiments, pores 357 are present within the composite body. The presence of pores 357 may facilitate a subsequent nitridation process of the composite body by providing a pore-network that allows nitrogen containing species (e.g., ammonia) to reach exposed aluminum containing surfaces within the composite body during processing.

Figure 4A:
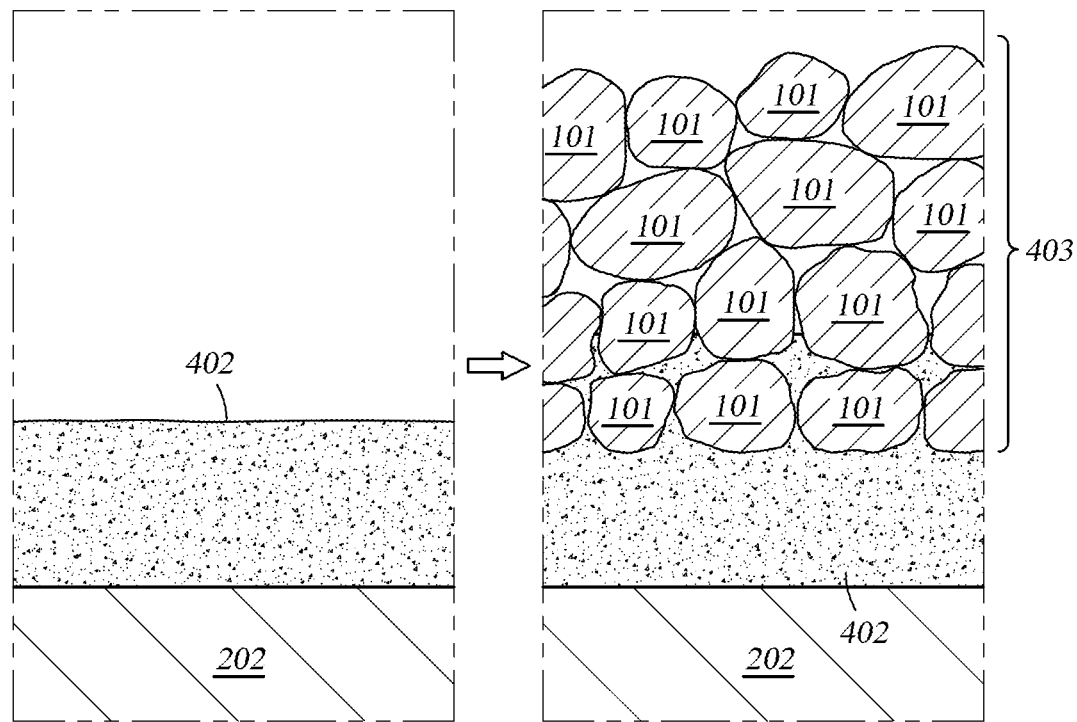
FIGS. 4A and 4B are simplified diagrams illustrating an alternative method of forming an infiltrated composite composition, according to an embodiment of the present disclosure.

In certain embodiments, an aluminum-containing foil or coating 402 is present on the carrier film 202 and underlying a dried slurry layer 403, as shown schematically in FIG. 4A. In certain embodiments, the carrier film 202 and dried slurry layer 403 are heated to a temperature above 600 degrees Celsius, for example, to a temperature between about 660 degrees Celsius and about 900 degrees Celsius, or between about 675 degrees Celsius and about 750 degrees Celsius, causing the aluminum-containing foil or coating 402 to melt and be drawn into the dried slurry layer by capillarity, forming an aluminum-containing coating 355 and aluminum-containing composite 359, as shown schematically in FIG. 4B. In certain embodiments, the melting and infiltration process is performed in vacuum, at a pressure below about $10^{-2}$ Torr, below about $10^{-3}$ Torr, below about $10^{-4}$ Torr, below about $10^{-5}$ Torr, below about $10^{-6}$ Torr, below about $10^{-7}$ Torr, or below about $10^{-8}$ Torr. In certain embodiments, the melting and infiltration process is performed under a nitrogen-containing atmosphere, such as $N_2$ or $NH_3$ or under an inert atmosphere, such as Ar, that is substantially free of oxygen and water. In certain embodiments, pores 357 are present within the composite body.

Referring again to FIG. 2A, in some embodiments, after formation of a green body 290A, such as an aluminum-infiltrated composite green body, the green body may be peeled off from the carrier film 202 and collected on the take-up reel 212 for further processing. The green body 290 may be characterized by a porosity between about 10% and about 80%, or between about 20% and about 60%. A lower level of porosity may be helpful in increasing the thermal conductivity of the aluminum-containing nitride matrix composite after nitridation, but a higher level of porosity may facilitate the nitridation process itself by virtue of easier access to ammonia during subsequent processing.

In certain embodiments, as shown in FIG. 2B, the slurry 201 is screen-printed or tape-cast onto a flexible carrier film 202 overlaid with a stencil mask 271 using a tape casting or doctor blade technique. In certain embodiments, the stencil mask 271 is fabricated from a polymer, such as Mylar™ or a silicone. In other embodiments, the stencil mask 271 is fabricated from a metal or metal alloy, such as stainless steel. In certain embodiments, the stencil mask 271 has openings 272 that are arranged in a square or hexagonal array across the surface of the stencil mask 271. In certain embodiments, the openings 272 in the stencil mask 271 are round and have a diameter between about 50 micrometers and about 100 millimeters, between about 200 micrometers and about 50 millimeters, between about 500 micrometers and about 20 millimeters, or between about 1 millimeter and about 10 millimeters. In certain embodiments, the stencil mask 271 has a thickness (i.e., vertical direction in FIG. 2B) between about 10 micrometers and about 1 millimeter, between about 20 micrometers and about 500 micrometers, or between about 50 micrometers and about 200 micrometers. In certain embodiments, fixtures are provided so that the stencil mask 271 separates from the carrier film 202 after the doctor blade 266 has applied the slurry 201 composition into openings 272 in the stencil mask 271, leaving discrete green body disks 290B on the carrier film 202, as shown schematically on the left side of FIG. 2B.

Figure 5A:
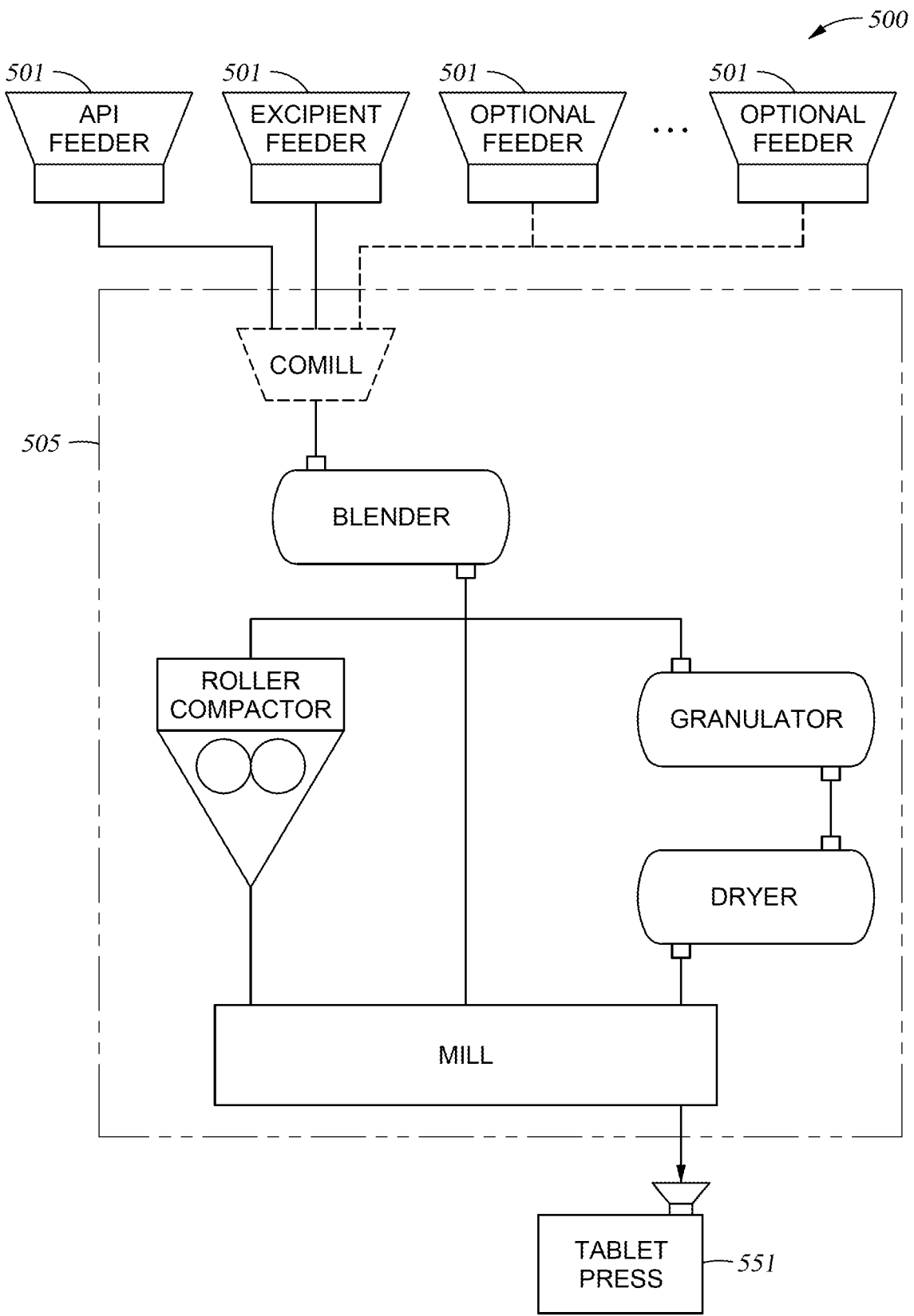
FIG. 5A is a simplified diagram showing a process flow for forming a green body by a tableting method, according to an embodiment of the present disclosure.

In certain embodiments, rather than forming a green body 290, such as a continuous green body film 290A (FIG. 2A) or green body disks 290B (FIG. 2B) by tape casting, as shown schematically in FIGS. 2A, 2B, and 2C, a green body including phosphor particles 101 can be formed by using a granulation and/or tableting process by use of tableting system 500, as shown schematically in FIG. 5A. Phosphor particles 101, with or without aluminum-containing coating 103 and/or aluminum-containing particles 105, can be mixed, along with one or more of a binder, lubricants, wetting agents, dispersants, deflocculants, other additives, and the like, by use of the material feeders 501 and use of one or more mixing and compacting components 505, as are known in the art. In certain embodiments, the mixture includes one or more of a wax composition and urea. In certain embodiments, the mixture may also include some liquid components. In certain embodiments, avoidance of protic components, such as polyvinyl alcohol and ethylene glycol, may be helpful in minimizing formation of $Al_2O_3$ and other oxides on the surfaces of phosphor particles 101 and of aluminum-containing coatings 103 and aluminum-containing particles 105. In certain embodiments, the mixing process is performed using a V-blender, a powder mixer, or the like. The mixed powder may be formed into granules by roller compaction, forming a ribbon, or approximately-spherical granules by use of a tablet press device 551. In certain embodiments, the ribbon is milled into granules by a milling process.

Figure 5B:
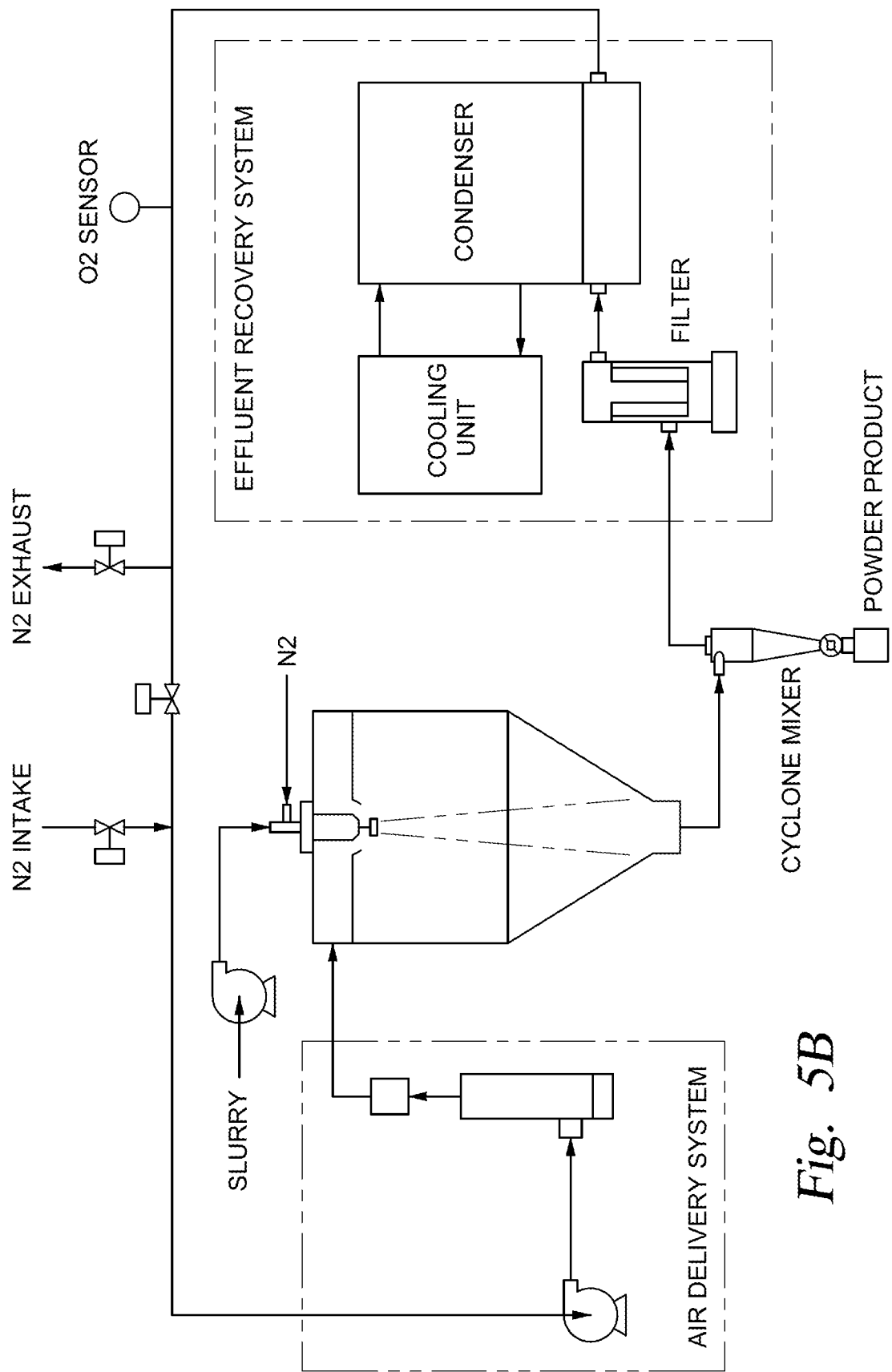
FIG. 5B is a simplified diagram showing a process flow for forming a mixed dry powder composition from a slurry using a spray dryer, according to an embodiment of the present disclosure.

In certain embodiments, as shown schematically in FIG. 5B, a slurry containing phosphor particles 101 is mixed in slurry form and then dried into powder (i.e., Powder Product) by use of a spray-drying process. The mixed powder, possibly with addition of additional components such as one or more of a binder, lubricants, wetting agents, dispersants, deflocculants, other additives, and the like, may be compacted into granules or the like.

Figure 5C:
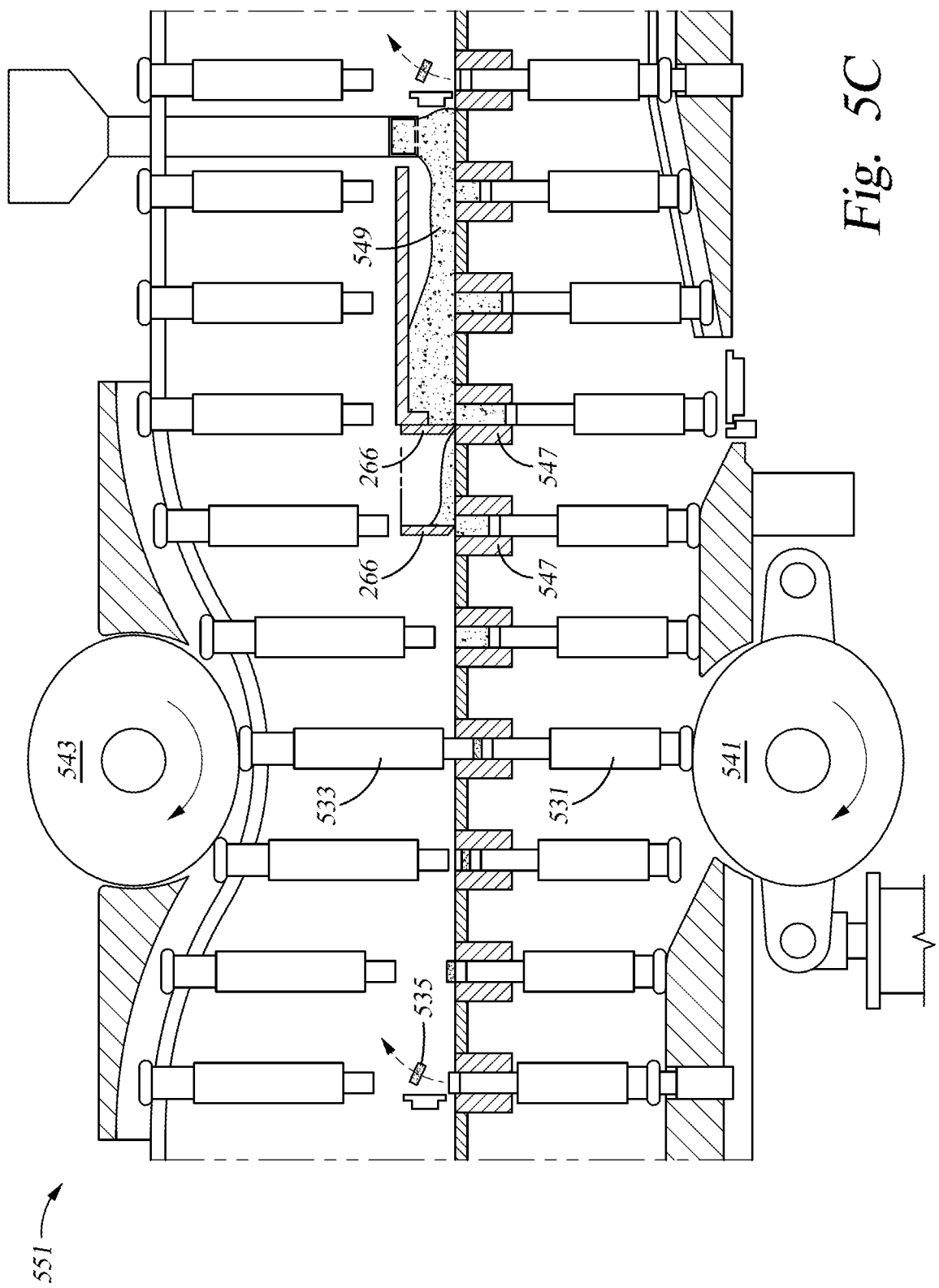
FIG. 5C is a simplified diagram of a conveyor system used to form tablets, according to an embodiment of the present disclosure.

The granules 549 may be fed into a tablet press 551 and uniaxially pressed into tablets, by methods that are known in the art, as shown in FIG. 5C. One or more doctor blades 266 may guide granules 549 into die cavities 547. Upper pistons 533 may be pushed downward by upper cam 543, and lower pistons 531 may be pushed upward by lower cam 541, causing formation of tablets 535, which may then be ejected.

In certain embodiments, the mixed powder is formed into pellets by use of a disk pelletizer, as is known the in art. The pellets may or may not be further densified by a tableting process. In certain embodiments, volatile components in the granules, pellets, or tablets are removed by a drying operation.

Figure 3A:
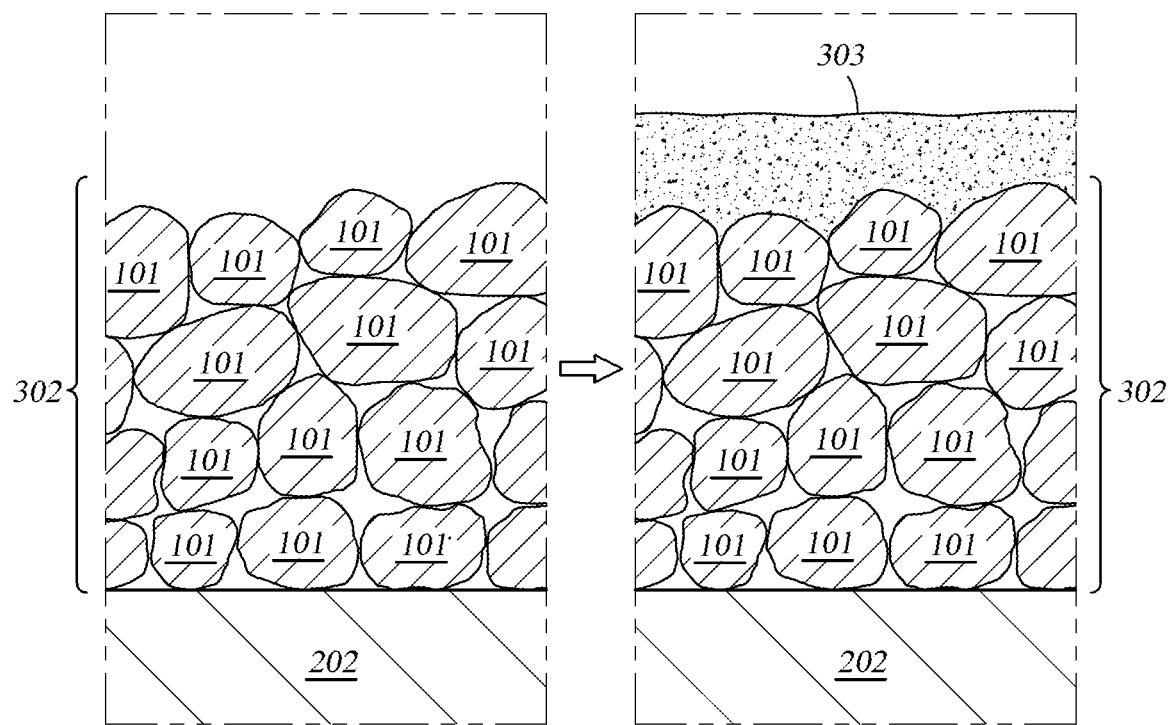
FIGS. 3A and 3B are simplified diagrams illustrating a method of forming an infiltrated composite composition, according to an embodiment of the present disclosure.
Figure 3B:
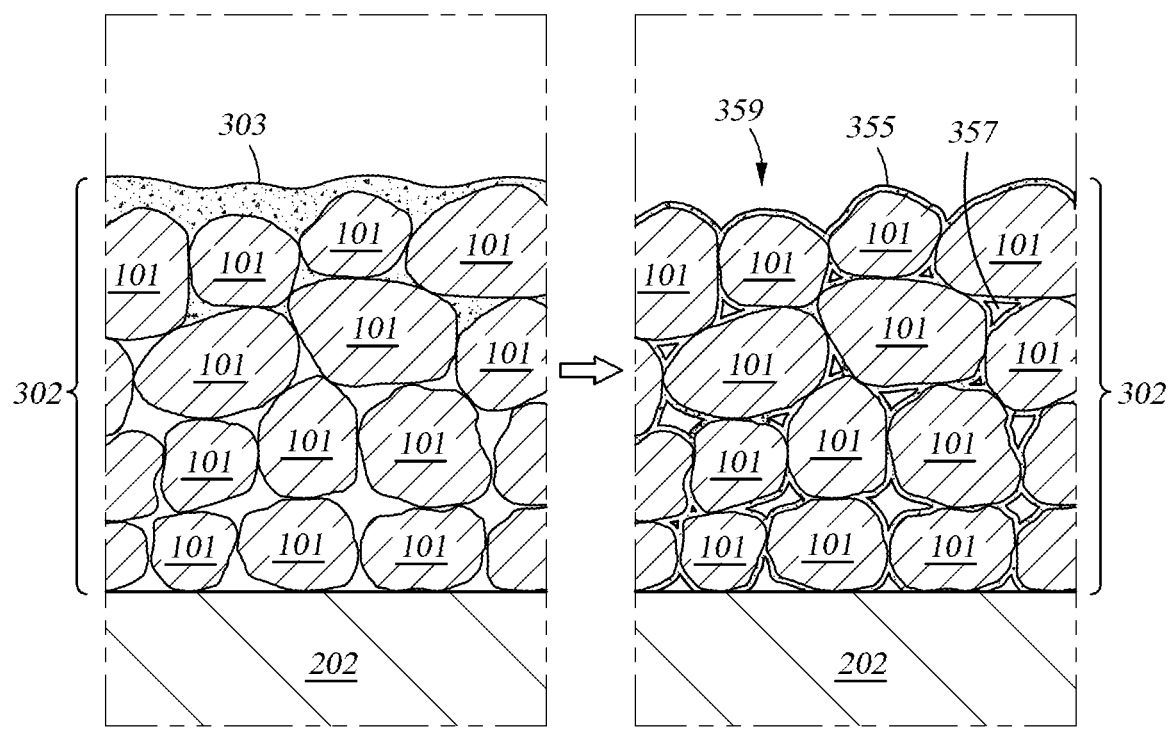

In certain embodiments, the granules, pellets, or tablets are infiltrated with an aluminum-containing composition by evaporation and heating, as shown schematically in FIGS. 3A and 3B. In certain embodiments, the granules, pellets, or tablets are infiltrated with an aluminum-containing composition by placement in contact with a foil or coating and heating, as shown schematically in FIGS. 4A and 4B.

Other methods are possible for incorporating the phosphor particles 101 into an aluminum-containing green body, including slip casting, uniaxial pressing, isostatic pressing, and screen printing.

In certain embodiments, the aluminum-containing coating or particle composition within a granule, pellet, tablet, or tape-cast green body has a purity, on a metals basis, between 99.9999% and 90%, between 99.9% and 95%, between 99.8% and 97%, or between 99.5% and 98%. In certain embodiments, the aluminum-containing coating or particle composition contains Fe and/or Si as impurities, for example, at concentrations between about 1 part per million and about 10 percent, or between about 10 parts per million and about 1 percent, by weight.

Figure 6:
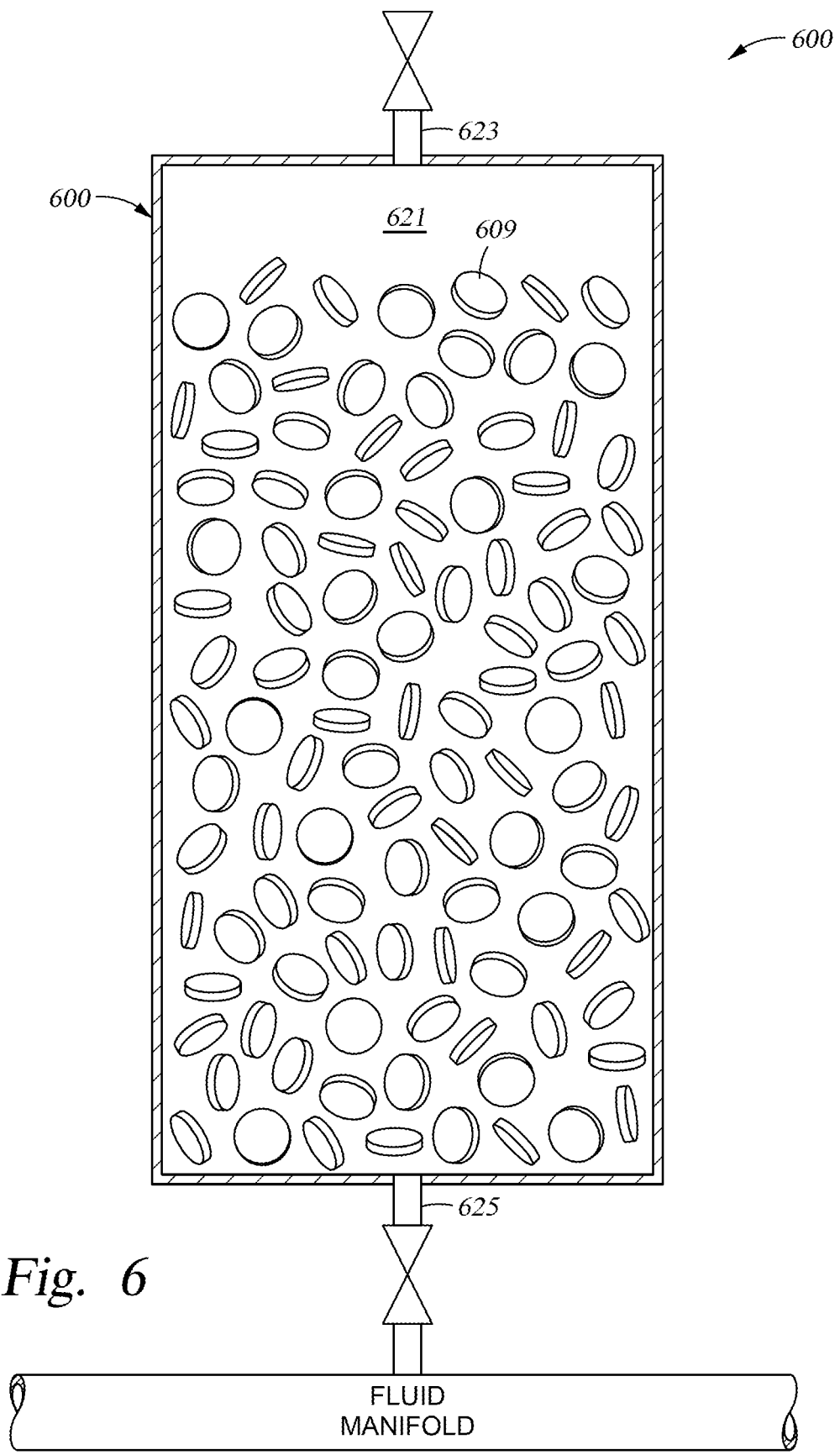
FIG. 6 is a simplified diagram showing a cross-sectional view of a sealable container containing granules, pellets, tablets, or other green body forms, according to an embodiment of the present disclosure.

The aluminum-containing green body 609, whether in granule, pellet, tablet, rolled-film, or other form, is then placed within interior 621 of a sealable container 600, as shown in FIG. 6. The sealable container 600 may include or consist of a capsule, an autoclave, or a liner within an autoclave. The capsule or liner may consist of or include at least one of silver, silver-based alloy, copper, copper-based alloy, gold, palladium, platinum, iridium, ruthenium, rhodium, titanium, iron, iron-based alloy, stainless steel, nickel, nickel-based alloy, zirconium, niobium, molybdenum, tantalum, combinations thereof, and the like. The sealable container may include one or more of fill tube or upper inlet 623 and lower inlet 625.

At least one mineralizer composition may be added to the sealable container. The mineralizer composition may consist of or include an alkali metal such as Li, Na, K, Rb, or Cs, an alkaline earth metal, such as Be, Mg, Ca, Sr, or Ba, or an alkali or alkaline earth hydride, amide, imide, amido-imide, nitride, or azide. The mineralizer may consist of or include an ammonium halide, such as $NH_4F$, $NH_4Cl$, $NH_4Br$, or $NH_4I$, an aluminum halide, such as $AlF_3$, $AlCl_3$, $AlBr_3$, $AlI_3$, or any compound that may be formed by a reaction of two or more of F, CI, Br, I, HF, HCl, HBr, HI, Al, AlN, and $NH_3$. The mineralizer may consist of or include other alkali, alkaline earth, or ammonium salts, other halides, urea, sulfur or a sulfide salt, or phosphorus or a phosphorus-containing salt. In a specific embodiment, the mineralizer includes or consists of at least one of $KN_3$ and $NaN_3$ and is substantially free of moisture.

In cases where the mineralizer is substantially free of the halogens Cl, Br, and I, silver may work well a material of construction for sealable container 600. When at least one of Cl, Br, and I is present at significant concentrations, however, gold, platinum, or platinum/iridium may be a better choice.

A getter may also be added to the sealable container 600. The getter preferentially reacts with residual or adventitious oxygen or moisture present in the processing region 621, including oxygen that may be present at the surfaces of the phosphor particles and/or of the aluminum-containing coating composition, improving the purity, thermal conductivity, and translucency of the aluminum-containing nitride ceramic matrix composite. Examples of suitable getters include beryllium, magnesium, calcium, strontium, barium, scandium, titanium, vanadium, chromium, yttrium, zirconium, niobium, the rare earth metals, hafnium, tantalum, and tungsten, and their nitrides, oxynitrides, amides, imides, amido-imides, halides, or oxyhalides. In a specific embodiment, the getter includes at least one of Be, Mg, Ca, Ba, Y, or their nitrides. In preferred embodiments, the getter oxide, for example, BeO, MgO, CaO, or $Y_2O_3$, as formed during the gettering process, is characterized by a high thermal conductivity, for example, above about 10 W/m-K, above about 20 W/m-K, above about 40 W/m-K, or above about 100 W/m-K.

In a specific embodiment, an azide mineralizer and the aluminum-containing coating or particle composition plus, optionally, additional metal, such as a getter in the form of a metal, for example, as a component of an aluminum-containing alloy, are provided in a predetermined ratio such that nitrogen generated by decomposition of the azide mineralizer and a hydrogen gas species generated by reaction of at least the metal with a supercritical ammonia are in a ratio of approximately 1:3. For example, under ammonthermal reaction conditions, aluminum and other metals, if present, will undergo one or more of the following reactions:

$$Al + NH_3 = AlN + 3/2\ H_2$$

$$Na + NH_3 = NaNH_2 + \tfrac{1}{2}\ H_2$$

$$K + NH_3 = KNH_2 + \tfrac{1}{2}\ H_2$$

$$3Be + 2NH_3 = Be_3N_2 + 3/2H_2$$

$$3Mg + 2NH_3 = Mg_3N_2 + 3/2H_2$$

$$3Ca + 2NH_3 = Ca_3N_2 + 3/2H_2$$

$$Ca + 2NH_3 = Ca(NH_2)_2 + H_2$$

$$Y + 3NH_3 = Y(NH_2)_3 + 3/2H_2$$

$$Y + NH_3 = YN + 3/2H_2$$

The use of azides as mineralizers is convenient in that they are often available commercially in high purity, can be purified further, and are considerably less hygroscopic than the alkali metals or amides or the alkaline earth nitrides, for example. However, azides typically decompose under reaction conditions, generating nitrogen:

$$3KN_3 + 2NH_3 = 3KNH_2 + 4N_2.$$

In a preferred embodiment, these two effects, that is, formation of hydrogen by reaction of a metal with ammonia and formation of nitrogen by decomposition of an azide, are combined so as to cancel each other out. Metals, including the aluminum-containing coating and/or particle composition, mineralizers, and getters, are added together with azide mineralizer precursors such that $H_2$ and $N_2$ are generated in approximately a 3:1 ratio. The sealable container may further include means for catalyzing $NH_3$ formation from $H_2$ and $N_2$. Catalysis of the reaction between $H_2$ and $N_2$ liberated in the reaction of the metal with ammonia and decomposition of the azide, respectively, to re-form ammonia may be performed by the walls of the sealable container or by a catalyst that is also provide within the sealable container. The added catalyst may comprise powder, granules, foil, a coating, bulk material, or a porous pellet. The added catalyst may include or consist of at least one of iron, cobalt, nickel, titanium, molybdenum, tungsten, aluminum, potassium, cesium, calcium, magnesium, barium, zirconium, osmium, uranium or a lanthanide, ruthenium, platinum, palladium, or rhodium. In a specific example, the added catalyst includes or consists of ruthenium sponge. For example, a mole of added $KN_3$ mineralizer will generate 4/3 mole of $N_2$ while being converted to $KNH_2$. The nitrogen generation can be counterbalanced by also adding 8/3 moles of Al and/or another metal, which will generate 8/3×3/2 mole=4 moles of $H_2$, viz., three times the number of moles of $N_2$ from $KN_3$.

The sealable container 600 is then closed and sealed except for one or more connections to a fluid manifold that includes at least one of a gas, liquid, or vacuum manifold. The sealable container may then be evacuated, so as to remove air, moisture, and other volatile contaminants. In some embodiments, the sealable container 600 is heated during evacuation, to a temperature between about 25 degrees Celsius and about 500 degrees Celsius. In some embodiments the sealable container is subjected to at least two, at least three, at least give, or at least ten cycles of evacuation followed by back-filling with an inert gas such as argon or nitrogen. In certain embodiments, referring again to FIG. 6, the sealable container is provided with at least a lower inlet 625, which may function as a gas-phase inlet, and an upper inlet 623, which may function as a gas-phase outlet, so that the sealable container can be purged by a continuous flow of gas. Purging may provide for superior removal of air, moisture, and other volatile contaminants, relative to evacuation, because of the limited conductance through a tube to the interior of the sealable container. The efficiency of purging may be enhanced by causing purge gas to flow from one end of the interior volume of the sealable container to the other. The sealable container may be coupled to a gas source within the fluid manifold by means of at least one fill tube or purge tube, preferably without exposing the contents of the sealable container to air, according to a specific embodiment. The gas source may comprise at least one of nitrogen, argon, hydrogen, helium, and ammonia, among others. Further details of arrangements for purging the sealable container are described in U.S. Pat. No. 8,444,765, which is hereby incorporated by reference in its entirety.

Figure 4B:
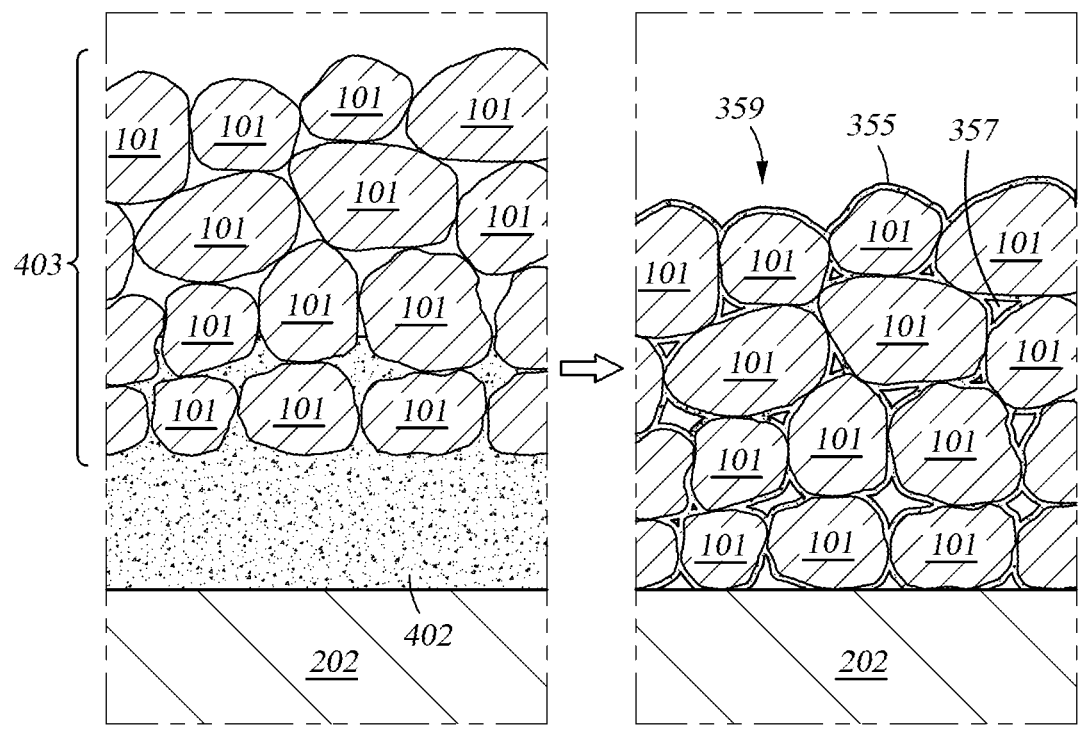

In certain embodiments, infiltration of an aluminum-containing composition into a phosphor-containing granule, pellet, tablet, or tape-cast film, as shown schematically in FIG. 3B or 4B, may be performed in situ within the sealable container, either under vacuum or while the sealable container is being purged by an inert gas, such as argon, or by a nitrogen-containing gas such as nitrogen or ammonia, for example, at a temperature between about 660 degrees Celsius and about 750 degrees Celsius.

After the pump-purge and/or flow-purge process is completed, the sealable container 600 may be cooled and filled with ammonia to a specified level. In certain embodiments, the sealable container 600 is cooled to dry ice temperature, for example, by immersion in a dry ice solvent bath or by use of a heat exchanger, and a controlled quantity of gaseous ammonia is flowed into the sealable container from the fluid manifold and condensed into a liquid phase. In other embodiments, a controlled amount of liquid ammonia is flowed into the sealable container 600 at an elevated pressure from a pumped fluid assembly in the fluid manifold, for example, above approximately seven atmospheres.

Figure 9:
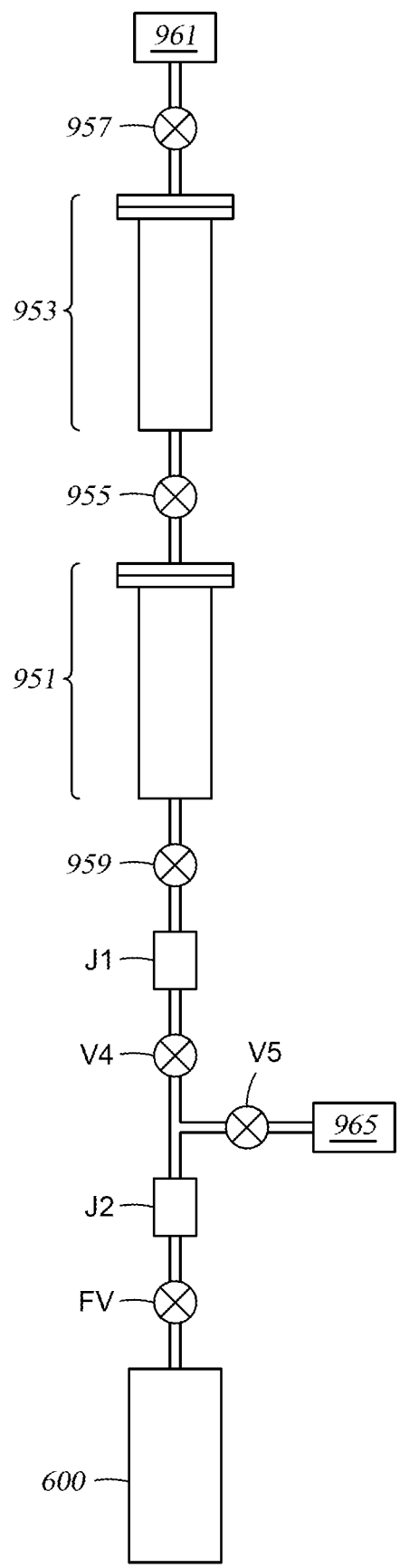
FIG. 9 is a schematic diagram showing a mineralizer vessel and a method of use according to an embodiment of the current disclosure.

In certain embodiments, the mineralizer is added to sealable container 600 together with liquid ammonia, for example, in solution. For example, referring to FIG. 9, a mineralizer composition may be weighed and added to a mineralizer vessel 951 within a glove box (not shown) and mineralizer vessel 951 may be sealed and removed from the glove box. Mineralizer vessel 951 and flush vessel 953 may be attached to an ammonia manifold 961. With valves 955 and 957 open, mineralizer vessel 951 may be chilled to dry ice temperature and filled with a predetermined quantity of ammonia. Then, with valve 957 open and valve 955 closed, flush vessel 953 may be chilled and filled with a predetermined quantity of ammonia. With valve 957 closed, flush vessel 953 and mineralizer vessel 951 may be disconnected from the ammonia manifold and warmed to room temperature, generating a solution of mineralizer in ammonia within mineralizer vessel 951, and connected to sealable container 600, which has been pre-evacuated. Valve 959 may then be opened, along with any additional valves between mineralizer vessel 951 and sealable container 600, causing the liquid-ammonia-mineralizer solution to be injected into sealable container 600. If desired, sealable container 600 may be chilled, or mineralizer vessel 951 heated, for example by 5 to 25 degrees Celsius, to cause the last residue of liquid ammonia to be transferred to sealable container 600. Valve 959 may then be closed and valve 955 opened, causing ammonia to transfer from flush vessel 953 to mineralizer vessel 951. If desired, mineralizer vessel 951 may be chilled, or flush vessel 953 heater, for example, by 5 to 25 degrees Celsius, to cause the last residue of liquid ammonia to be transferred from flush vessel 953 to mineralizer vessel 951. Mineralizer vessel 951 may be warmed to room temperature, causing re-dissolution of any traces of mineralizer left behind from the first ammonia transfer from mineralizer vessel 951 to sealable container 600. Valve 959 may then be opened, along with any additional valves (e.g., V4 and FV) between mineralizer vessel 951 and sealable container 600, causing the liquid ammonia with traces of dissolved mineralizer to be injected into sealable container 600. This process can be repeated additional times as desired. Additional ammonia can be added to sealable container 600 as described above. After processing any residual ammonia may be evacuated through an outlet 965.

The fraction of free volume within the sealable container 600 that is filled with liquid ammonia may be between about 10% and about 95%, between about 20% and about 90%, between about 30% and about 80%, or between about 40% and about 70%. After the desired amount of ammonia has been added to the sealable container 600, the sealable container 600 may be closed and sealed. The sealing process may include one or more of closing a valve, ultrasonically welding a fill tube, such as upper inlet 623 and/or lower inlet 625, and tungsten-inert-gas welding of a fill tube, such as upper inlet 623 and/or lower inlet 625.

In certain embodiments, the ammonia-filling process is performed while the sealable container is enclosed within a pressure vessel (or is the pressure vessel, in the case where the sealable container is an autoclave). In certain embodiments, the sealable container 600 is placed within a pressure vessel after filling with ammonia and sealing.

Figure 7:
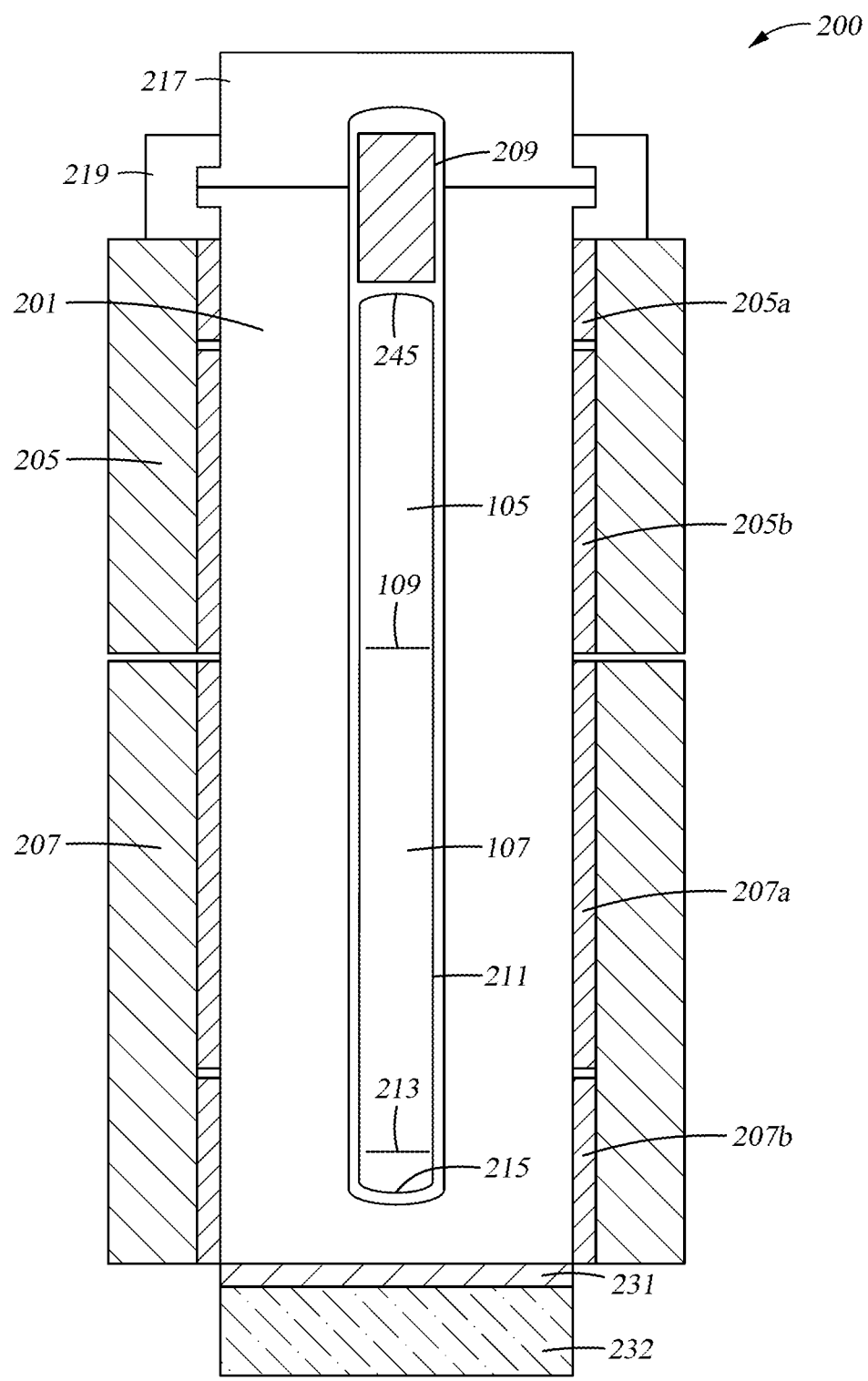
FIG. 7 is a schematic diagram showing a pressure vessel apparatus, according to an embodiment of the current disclosure.

In certain embodiments, the pressure vessel is an autoclave and the sealable container 600 is a liner or capsule 211 within autoclave 200, as shown schematically in FIG. 7. The autoclave may be capable of processing a material in a fluid at a pressure above about 5 MPa and below about 800 MPa, below about 500 MPa, below about 400 MPa, below about 300 MPa, below about 200 MPa, or below about 100 MPa, at temperatures between about 50 degrees Celsius and about 900 degrees Celsius, between about 100 degrees Celsius and about 600 degrees Celsius, between about 150 degrees Celsius and about 500 degrees Celsius, or between about 200 degrees Celsius and about 400 degrees Celsius. Referring again to FIG. 7, autoclave 200 includes an autoclave body 201. The upper portion of autoclave body 201 may be surrounded by an upper heater 205 and the lower portion of autoclave body may be surrounded by a lower heater 207, each of which may include insulation. Upper heater 205 may include one, two, or more independently-controllable hot zones, for example, top tail zone 205a and top main zone 205b. Lower heater 207 may include one, two, or more independently-controllable hot zones, for example, bottom main zone 207a and bottom tail zone 207b. Upper heater 205 and lower heater 207 may be physically joined into a unitary component but are typically independently controllable. In certain embodiments, a liner 211 is placed within a cavity of autoclave body 201. Liner 211 may be formed from or may include one or more of platinum, palladium, iridium, a Pt/Ir alloy, gold, or silver. Liner 211 may also include or be formed from one or more of titanium, rhenium, copper, stainless steel, zirconium, tantalum, molybdenum, niobium, alloys thereof, and the like.

In certain embodiments, autoclave 200 further includes autoclave cap 217 and closure fixture 219, as shown schematically, plus a gasket (not shown). The configuration shown in FIG. 7 is a schematic representation of a Grayloc™ seal. In other embodiments, autoclave 200 includes one or more of an unsupported Bridgman seal, an o-ring seal, a confined gasket seal, a bolted closure, an AE™ closure, an EZE-Seal™, a Keuntzel closure, a ZipperClave™ closure, a threadless pin closure, or a Gasche™ gasket seal. In certain embodiments, autoclave 200 further includes a cap, closure fixture, and seal on the lower end, in addition to the cap, closure fixture, and seal on the upper end.

Autoclave body 201, autoclave cap 217, and closure fixture 219 may each be fabricated from a material selected from a group consisting of steel, low-carbon steel, SA723 steel, SA266 carbon steel, 4340 steel, A-286 steel, iron based superalloy, nickel based superalloy, cobalt based superalloy, Inconel 718, Rene 41, 304 stainless steel, 310 stainless steel, 316 stainless steel, 340 stainless steel, 410 stainless steel, and 17-4 precipitation hardened stainless steel, zirconium and its alloys, titanium and its alloys, and other materials commonly known as Monel, Inconel, Hastelloy, Udimet 500, Stellite, Rene 41, and Rene 88. One or more of the components comprising autoclave body 201, autoclave cap 217, and closure fixture 219 may undergo a heat treatment operation. In certain embodiments, autoclave body 201 includes a demountable seal at the bottom as well as at the top.

Autoclave 200 may further comprise a bottom end heater 231 that is thermally coupled to the bottom portion of autoclave body 201 and includes thermal insulation 232. Bottom end heater 231 generates a power distribution that is approximately azimuthally uniform about the axis of autoclave body 201. The power level in bottom end heater 231, relative to the power level in lower heater 207 and upper heater 205, along with the radial dependence of the power density within bottom end heater 231, is chosen so as to maintain a temperature distribution along bottom surface 215 that is uniform to within 10 degrees Celsius, within 5 degrees Celsius, within 2 degrees Celsius, within 1 degree Celsius, within 0.5 degree Celsius, or within 0.2 degree Celsius. In certain embodiments, the power level in bottom end heater 231, relative to the power level in lower heater 207 and upper heater 205, along with the radial dependence of the power density within bottom end heater 231, is chosen so as to maintain an average temperature of bottom surface 215 that is equal to the average temperature within a specified height, measured with respect to bottom surface 215, of the inner surface of liner 211, or of the inner surface of autoclave body 201 if the liner 211 is not present, to within 20 degrees Celsius, within 10 degrees Celsius, within 5 degrees Celsius, within 2 degrees Celsius, or within 1 degree Celsius. In certain embodiments the specified height is approximately 1 centimeter, 5 centimeters, 10 centimeters, 20 centimeters, or 25 centimeters. In certain embodiments, the bottom end heater 231 is configured with at least two or at least three independently-controllable hot zones.

In certain embodiments, autoclave 200 further includes a top insulator/heater 209. In certain embodiments, top insulator/heater 209 includes or consists of a load-bearing thermal insulator, for example, zirconia or another ceramic material with a low thermal conductivity. In certain embodiments, top insulator/heater also has capability to generate heat, for example, by means of electrical connections through autoclave cap 217. In certain embodiments, top insulator/heater 209 includes one or more of a cartridge heater, a cable heater, a disk heater, or the like. Top insulator/heater 209 may have finished surfaces so that it fits snugly against a lower surface of autoclave cap 217 and against top surface 245 of liner 211 and sufficient radial clearance with respect to an inner surface of autoclave body 201 for easy insertion and removal without enabling extrusion of an upper portion of liner 211 into a radial gap during high pressure operation. The dimensions of top insulator/heater 209 and its power level, if present, along with the power levels in lower heater 207 and upper heater 205, including a top zone within upper heater 205, along with the radial dependence of the power density within top insulator/heater 209, may be chosen so as to maintain a temperature distribution along top surface 245 that is uniform to within 10 degrees Celsius, within 5 degrees Celsius, within 2 degrees Celsius, or within 1 degree Celsius. In addition, the dimensions of top insulator/heater 209 and the power levels of upper heater 205 and lower heater 207 may be chosen to maintain top surface 245 at an average temperature that is equal to the average temperature within a specified height, measured with respect to top surface 245, of the inner surface of liner 211, or of the inner surface of autoclave body 201, if liner 211 is not present, to within 20 degrees Celsius, within 10 degrees Celsius, within 5 degrees Celsius, within 2 degrees Celsius, or within 1 degree Celsius. In certain embodiments the specified height is approximately 1 centimeter, 5 centimeters, 10 centimeters, 20 centimeters, or 25 centimeters. In certain embodiments, the top insulator/heater 209 is configured with at least two or at least three independently-controllable hot zones.

Figure 8:
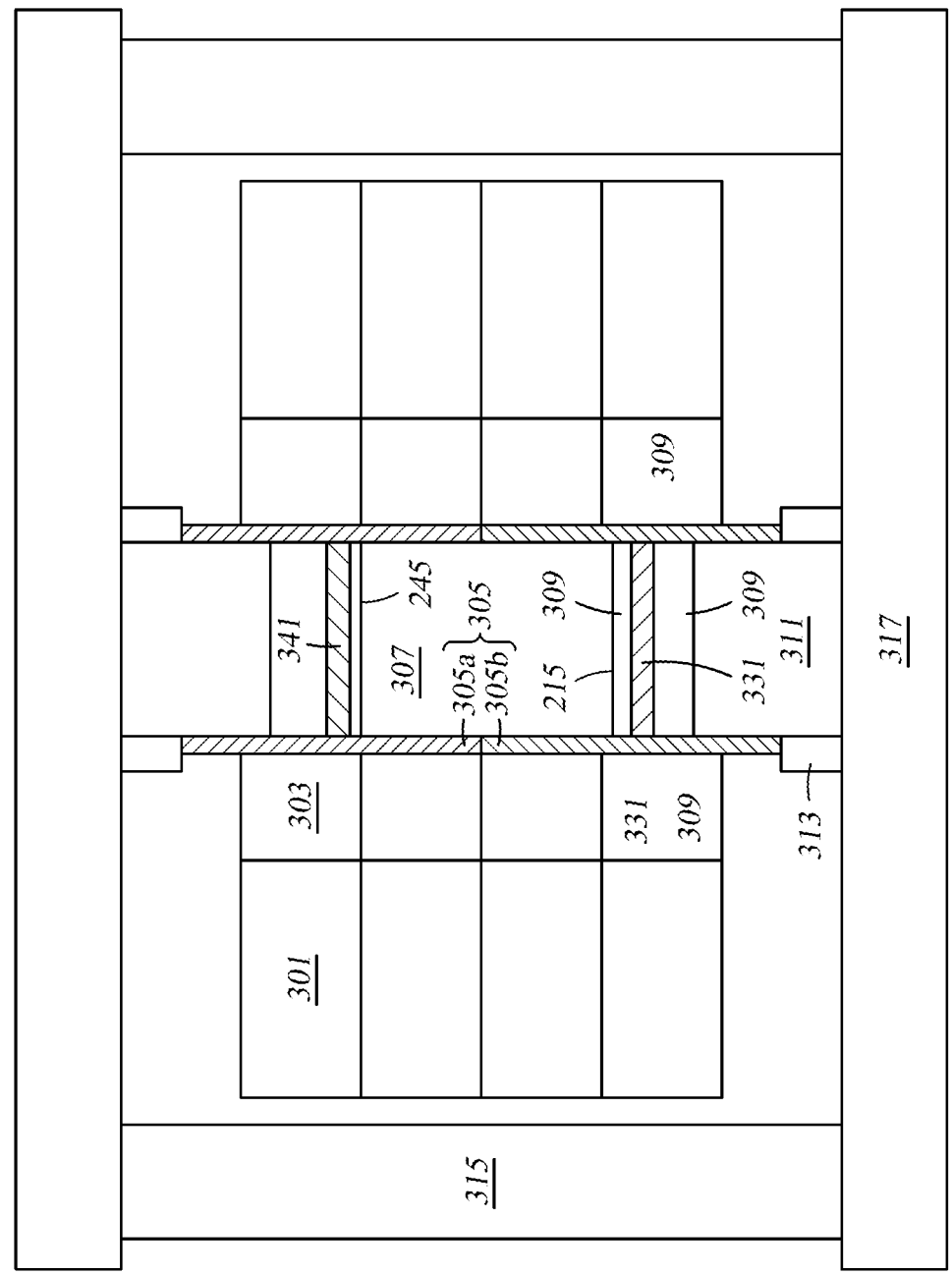
FIG. 8 is a schematic diagram showing an internally-heated pressure vessel, apparatus according to an embodiment of the current disclosure.

In certain embodiments, sealable container 600 is placed within an internally-heated high-pressure apparatus 300 as capsule 307, as shown schematically in FIG. 8. The internally-heated high-pressure apparatus 300 provides adequate containment in all directions which, for a typical cylindrical vessel, can be classified as radial and axial. Furthermore, depending on the specifics of the design parameters, the apparatus is capable of operating at temperatures between 200 degrees Celsius and 1500 degrees Celsius, pressures between about 5 MPa and about 2000 MPa, for between about 1 hour and about 180 days. The internally-heated high-pressure apparatus 300 may include a stack of one or more ring assemblies to provide radial confinement, comprising a high strength enclosure ring 301 and a ceramic ring 303. The stack may include greater than 2, greater than 5, greater than 10, greater than 20, greater than 30, greater than 50, or greater than 100 ring assemblies. The stack surrounds heater or heating member 305 and capsule 307 and may be supported mechanically by at least one support plate (not shown). In other words, the heating member or heater may be positioned between the capsule and one or more radial restraint structures comprise a high strength enclosure ring and a ceramic ring 303. The stack may provide radial confinement for pressure generated within capsule 307 and transmitted outward through heater 305. Heater 305 includes an upper heater 305a and a lower heater 305b. Each of upper heater 305a and lower heater 305b may include one, two, or more independently-controllable hot zones. Upper heater 305a and lower heater 305b may be physically joined into a unitary component but are typically independently controllable. The interior of heater 305 may define a processing chamber, into which capsule 307 may be placed. In the case that the ring assemblies in the die stack are comprised of high strength enclosure ring 301 and ceramic ring 303, there may be an interference fit between the two members in each ring assembly. Means for external cooling of the one or more ring assemblies or radial restraints may be provided. In certain embodiments, capsule 307 includes an inner capsule member and an outer capsule member (not shown).

Axial confinement of pressure generated within capsule 307 may be provided by end plugs 311, crown members 317, and tie rods or tie rod fasteners 315. End plugs 311 may comprise zirconium oxide or zirconia. Alternative end plug materials may include magnesium oxide, aluminum oxide, silicon oxide, silicon carbide, tungsten carbide, steel, nickel alloys, titanium alloys, salts, and phyllosilicate minerals such as aluminum silicate hydroxide or pyrophyllite, according to a specific embodiment. End plugs 311 may be surrounded by end plug jackets 313. End plug jackets may provide mechanical support and/or radial confinement for end plugs 311. End plug jackets 313 may also provide mechanical support and/or axial confinement for heater 305. End plug jackets 313 may comprise steel, stainless steel, an iron-based alloy, a nickel-based alloy, or the like. In certain embodiments, tie rod fasteners 315 are arranged in a configuration that provides axial loading of two or more ring assemblies. Further details are provided in U.S. Pat. Nos. 9,724,666 and 10,174,438, which are hereby incorporated by reference in their entirety.

Crown members 317 and tie rod fasteners 315 may comprise a material selected from a group consisting of steel, low-carbon steel, SA723 steel, SA266 carbon steel, 4340 steel, A-286 steel, iron based superalloy, 304 stainless steel, 310 stainless steel, 316 stainless steel, 340 stainless steel, 410 stainless steel, 17-4 precipitation hardened stainless steel, zirconium and its alloys, titanium and its alloys, and other materials commonly known as Monel, Inconel, Hastelloy, Udimet 500, Stellite, Rene 41, and Rene 88.

Internally-heated high-pressure apparatus 300 may include a pressure transmission medium 309 proximate to the axial ends of capsule 307 and to end plugs 311 according to a specific embodiment. Pressure transmission medium 309 may include multiple components, for example, one or more disks. The pressure transmission medium may comprise sodium chloride, other salts, or phyllosilicate minerals such as aluminum silicate hydroxide or pyrophyllite, or other materials, according to a specific embodiment. In certain embodiments, pressure transmission medium 309 may comprise one or more of metal halides, such as NaCl, NaBr, AgCl, AgBr, CaF$_2$, SrF$_2$, graphite, hexagonal boron nitride, talc, soapstone, gypsum, limestone, alabaster, molybdenum disulfide, calcium carbonate, magnesium oxide, zirconium oxide, merylinite clay, bentonite clays, or sodium silicate.

Internally-heated high-pressure apparatus 300 may further comprise a bottom end heater 331 and/or a top end heater 341 that are thermally coupled to the bottom portion and the top portion of capsule 307, respectively. Bottom end heater 331 generates a power distribution that is approximately azimuthally uniform about the axis of heater 305 and the relative power level in bottom end heater 331, relative to the power level in lower heater 305*b* and upper heater 305*a*, along with the radial dependence of the power density within bottom end heater 331, is chosen so as to maintain a temperature distribution along bottom surface 215 that is uniform within 10 degrees Celsius, within 5 degrees Celsius, within 2 degrees Celsius, or within 1 degree Celsius. In certain embodiments, the relative power level in bottom end heater 331, relative to the power level in lower heater 305*b* and upper heater 305*a*, along with the radial dependence of the power density within bottom end heater 331, is chosen so as to maintain an average temperature of bottom surface 215 that is equal to the average temperature within a specified height, measured with respect to bottom surface 215, of the inner surface of capsule 307 to within 10 degrees Celsius, within 5 degrees Celsius, within 2 degrees Celsius, or within 1 degree Celsius. In certain embodiments the specified height is approximately 1 centimeter, 5 centimeters, 10 centimeters, 20 centimeters, or 25 centimeters. Top end heater 341 generates a power distribution that is approximately azimuthally uniform about the axis of heater 305 and the relative power level in top end heater 341, relative to the power level in lower heater 305*b* and upper heater 305*a*, along with the radial dependence of the power density within top end heater 341, is chosen so as to maintain a temperature distribution along top surface 345 that is uniform within 10 degrees Celsius, within 5 degrees Celsius, within 2 degrees Celsius, or within 1 degree Celsius. In certain embodiments, the relative power level in top end heater 341, relative to the power level in lower heater 305*b* and upper heater 305*a*, along with the radial dependence of the power density within bottom end heater 331, is chosen so as to maintain an average temperature of top surface 345 that is equal to the average temperature within a specified height, measured with respect to top surface 345, of the inner surface of capsule 307, to within 10 degrees Celsius, within 5 degrees Celsius, within 2 degrees Celsius, or within 1 degree Celsius.

The pressure vessel, for example, autoclave 200 (FIG. 7) or internally-heated high-pressure apparatus 300 (FIG. 8), is then closed and sealable container 600 is then heated to a temperature above about 400 degrees Celsius and pressurized above about 10 MPa, causing the ammonia within sealable container 600 to become a supercritical fluid. In certain embodiments, the temperature is initially raised to a first, intermediate value, for example, between about 100 degrees Celsius and about 400 degrees Celsius, to enable reaction of aluminum and other metals within sealable container 600 to form hydrogen, as described above, and for an azide mineralizer, if present, to decompose into amide plus nitrogen, as described above, and for catalyzed reaction between hydrogen and nitrogen to form ammonia. The temperature may then be raised to a second value, for example, between about 400 degrees Celsius and about 1000 degrees Celsius, between about 500 degrees Celsius and about 800 degrees Celsius, or between about 600 degrees Celsius and about 700 degrees Celsius, and a pressure between about 10 MPa and about 1000 MPa, between about 50 MPa and about 750 MPa, or between about 100 MPa and about 500 MPa. In certain embodiments, referring again to FIG. 8, the power levels in bottom end heater 331, top end heater 341, upper heater 305*a* and lower heater 305*b* are adjusted so as to maintain a temperature within capsule 307 (same as sealable container 600) that is uniform to within about 20 degrees Celsius, within about 10 degrees Celsius, within about 5 degrees Celsius, within about 2 degrees Celsius, or within about 1 degree Celsius. The temperature may be maintained at this temperature for a period between about one hour and about 30 days, or between about 2 hours and about 7 days, or between about 3 hours and about 96 hours.

Referring again to FIG. 6, during the time that sealable container 600 is held at elevated temperature in supercritical ammonia in the presence of a mineralizer, aluminum present in aluminum-containing green bodies 609 is converted to AlN and, in effect, sinters, together with phosphor particles 101, forming an aluminum-containing nitride ceramic matrix composite with a high thermal conductivity. Without wishing to be bound by theory, the inventors believe that supercritical ammonia enters pores 357 (cf. FIGS. 3B and 4B) in aluminum-containing green bodies 609 and also into cracks that are formed during a process whereby aluminum reacts with NH$_3$ to form AlN, resulting in a local volume increase of approximately 25.7%. A portion of the AlN dissolves, by means of chemical reaction with the mineralizer. For example, in the case of a basic mineralizer, the following reversible reaction may occur:

The dissolved intermediate (KAl(NH$_2$)$_4$ in the specific example) may then transport across a pore 357, whereupon the reverse reaction may occur, depositing AlN in a different location. In this way the supercritical fluid provides a mechanism by which Al atoms and AlN units within the ceramic composite can move, similar in many respects to surface diffusion processes that occur during ceramic sintering processes at much higher temperatures. Coarsening of the grains, and densification of the ceramic composite, occurs for the same reason it does during normal sintering processes, namely, reduction of the surface energy within the ceramic composite. However, since the supercritical fluid dissolution/re-deposition process takes place at a much lower temperature than is required for sintering, it is much easier to maintain good properties within the phosphor particles 101, such as external quantum efficiency, and also much easier to incorporate two or more distinct types of phosphor particles in close proximity to one another within a single composite member with a high thermal conductivity, than is the case with traditional sintering processes. However, it is important to maintain a temperature within sealable container 600 that is approximately uniform, otherwise the dissolved intermediate may be transported to another location within sealable container 600 that is hotter or cooler, depositing AlN at that location rather than within the ceramic composite. For example, Peters [Journal of Crystal Growth 104, 411 (1990)] showed that AlN single crystals could be formed on the hottest surfaces within a pressure vessel by conversion of Al metal to AlN, together with macroscopic transport within supercritical ammonia with KNH$_2$ present as mineralizer. In the present disclosure, macroscopic transport of dissolved Al is inhibited by maintaining an approximately isothermal environment, together with limited conductance within sealable container 600, for example, by dense packing of aluminum-containing green bodies 609 within sealable container 600 or the use of a rolled layer of composite material (cf. green body 290A in FIG. 2A).

In addition, without wishing to be bound by theory, the inventors believe that getter metal nitrides, formed by reaction with supercritical ammonia from getter metals, if present, will react with oxide on the surfaces of aluminum-containing coatings or particles:

$$Be_3N_2+Al_2O_3=3BeO+2AlN$$

$$Mg_3N_2+Al_2O_3=3MgO+2AlN$$

$$2ScN+Al_2O_3=Sc_2O_3+2AlN$$

$$2YN+Al_2O_3=Y_2O_3+2AlN$$

In cases where the getter metal is included within the aluminum-containing coatings or particles, the resulting getter metal nitrides and oxides will likely remain within the resulting aluminum-containing ceramic matrix composite. In cases where the getter metal is added in only slight excess with respect to the oxygen content in the aluminum-containing coatings or particles and the getter metal oxide has a higher thermal conductivity than Al$_2$O$_3$, for example, BeO or MgO, the thermal conductivity of the aluminum-containing ceramic matrix composite can be enhanced significantly by the addition of the getter metal.

After a predetermined period of time at the second temperature, the sealable container may be cooled, the ammonia released from it, removed from the pressure vessel, and opened. The aluminum-containing ceramic matrix composite material may then be removed. In certain embodiments, individual granules, pellets, or tablets of ceramic matrix composite material are prepared by one or more of jaw crushing, cone crushing, hammer crushing, milling, grinding, vibration, and other forms of comminution that are known in the art. In certain embodiments, individual granules, pellets, or tablets of ceramic matrix composite material undergo further processing, such as one or more of dicing, sawing, grinding, double-side lapping, polishing, tumbling, etching, or the like, to form a finished aluminum-containing ceramic matrix composite part.

The finished aluminum-containing ceramic matrix composite part may include at least one, at least two, or at least three phosphor compositions within a matrix that consists substantially of AlN, with a phosphor-to-AlN ratio, by volume, between about 1% and about 99%, between about 5% and about 95%, between about 10% and about 90%, or between about 20% and about 80%. The finished aluminum-containing ceramic matrix composite part may have a porosity between about 1% and about 50%, between about 2% and about 25%, between about 3% and about 20%, or between about 4% and about 10%. The finished aluminum-containing ceramic matrix composite part may have a thermal conductivity between about 1 watt per meter-Kelvin and about 320 watts per meter-Kelvin, between about 5 watts per meter-Kelvin and about 260 watts per meter-Kelvin, between about 10 watts per meter-Kelvin and about 170 watts per meter-Kelvin, or between about 20 watts per meter-Kelvin and about 100 watts per meter-Kelvin. At least one, at least two, or at least three of the phosphor components within the finished aluminum-containing ceramic matrix composite part may have an internal quantum efficiency of at least about 30%, at least about 50%, at least about 75%, or at least about 90%. At least one, at least two, or at least three of the phosphor components within the finished aluminum-containing ceramic matrix composite part may have luminous efficacy of at least about 30 lumens per watt, at least about 50 lumens per watt, at least about 100 lumens per watt, or at least about 150 lumens per watt. An aluminum nitride matrix material may have an optical absorption coefficient at wavelengths between about 400 nanometers and about 750 nanometers that is less than about 100 cm$^{-1}$, less than about 50 cm$^{-1}$, less than about 20 cm$^{-1}$, less than about 10 cm$^{-1}$, less than about 5 cm$^{-1}$, less than about 2 cm$^{-1}$, or less than about 1 cm$^{-1}$.

In certain embodiments, one or more of the phosphor compositions among phosphor particles 101 may have significant solubility in the supercritical fluid composition that includes ammonia and a mineralizer composition. In these cases, direct bonds between neighboring phosphor particles may form, in addition to bonds between the phosphor particles and the AlN matrix. For example, direct "sintering" within and between nitride and oxynitride phosphor compositions, for example, β-SiAlON:Eu$^{2+}$, α-SiAlON:Eu$^{2+}$, and CaAlSiN$_3$:Eu$^{2+}$, may take place. In certain embodiments, the methods described in the present disclosure may be used to fabricate phosphor-containing ceramic composites that are entirely free of AlN. For example, a green body including phosphor particles and additives may be produced by a slip casting (FIG. 2A) and/or tableting (FIG. 5A) process. After placement, the phosphor-containing green bodies may be placed in a sealable container (FIG. 6), along with a mineralizer and, optionally, one or more of a getter material for removal of surface oxide and a catalyst for conversion of H$_2$ and N$_2$ into NH$_3$. After pumping, purging, addition of NH$_3$, and sealing, the sealable container may then be heated to a first temperature, for example, between about 100 degrees Celsius and about 400 degrees Celsius, and a second temperature, for example, between about 400 degrees Celsius and about 1000 degrees Celsius, as described above. The resulting phosphor ceramic composite may be processed into finished phosphor ceramic composite parts as described above.

A finished aluminum-containing nitride ceramic matrix composite formed by the one or more processes described above may be incorporated into a package along with one or more of a laser diode and a light-emitting diode. For example, violet or blue light from a laser diode or a light-emitting diode may illuminate or be focused on the aluminum-containing nitride ceramic matrix composite, resulting in emission of blue, green, yellow, orange, and/or red light. In certain embodiments, the overall outgoing light from the package, including reflected light from the laser diode or light-emitting diode and light emitted by the phosphor, is white light. In certain embodiments, the white light has a color rendition index (CRI) greater than about 80, greater than about 85, greater than about 90, greater than about 95, greater than about 98, or greater than about 99. In certain embodiments, the white light has a CRI R9 value greater than about 50, greater than about 70, greater than about 80, or greater than about 90. The aluminum-containing nitride ceramic matrix composite may be bonded to a heat sink to dissipate heat generated during the light conversion within the phosphor. In certain embodiments, one or more aluminum-containing ceramic matrix composite parts is incorporated within a surface mount device (SMD), which may be advantageous as a compact, cost-effective package.

METHOD EXAMPLE(S)

The methods described herein provide means for fabricating high-performance ceramic matrix composites that include phosphor compositions having a high thermal conductivity and a high internal quantum efficiency.

Example 1

Aluminum powder, having a particle size between about 10 micrometers and about 100 micrometers, is prepared within a glove box having oxygen and water concentrations below 1 part per million by filing a high-purity aluminum ingot. A green β-SiAlON:$Eu^{2+}$ phosphor and a red CaAlSiN$_3$:$Eu^{2+}$ phosphor, each having a particle size between about 5 micrometers and about 50 micrometers are provided, and a blend containing aluminum, green phosphor, and red phosphor, in a ratio of 5:1:2 by weight, is prepared in a mortar and pestle in the glove box. The powder blend is pressed into disks, having a diameter of 6 millimeters and a thickness of 1 mm at a pressure of about 50 MPa, having a green porosity between about 10% and about 40%. The disks are placed into a silver containing capsule having an outer diameter of 1.00 inch and a length of 5.25 inches within the glove box and the capsule is welded closed using an orbital welder. 4.0 g of $KN_3$ powder is placed within a stainless steel mineralizer vessel similar to that shown schematically in FIG. 9 within the glove box and the vessel is closed by means of a ConFlat® (CF) flange. The mineralizer vessel, with an attached flush vessel similar to that shown schematically in FIG. 9, and the capsule are removed from the glove box. The mineralized vessel is chilled to dry ice temperature and filled with 10.0 g of ammonia, and the flush vessel is chilled to dry ice temperature and filled with 9.0 g of ammonia, and then both vessels are warmed to room temperature and connected to the capsule. The capsule is chilled to dry ice temperature and valves between the mineralizer vessel and the capsule are opened, transferring the liquid-ammonia-mineralizer solution to the capsule. The exit valve of the mineralizer vessel is then closed and a valve between the flush vessel and the mineralizer vessel is opened, transferring the liquid ammonia from the flush vessel to the mineralizer vessel. The flush vessel is warmed gently with a heat gun to drive any remaining liquid ammonia into the mineralizer vessel. The valves between the mineralizer vessel and the capsule are opened again, transferring the remaining ammonia to the capsule. A fill tube on the capsule is then welded closed and severed, and the capsule is loaded into an internally-heated high-pressure apparatus.

The high-pressure is ramped to a temperature of 675 degrees Celsius over a period of 8 hours, held at this temperature, with no intentional temperature gradient, for 24 hours, and cooled. Ammonia is removed from the capsule, the capsule is removed from the high-pressure apparatus, opened, and the disks are removed. The disks are examined by optical and scanning electron microscopy (SEM)/energy dispersive spectrometry (EDS) and by x-ray powder diffraction, their porosity is measured by mercury porosimetry, their thermal diffusivity is measured by a laser flash method, their specific heat capacity is measured using a differential scanning calorimeter, and their thermal conductivity is calculated as the product of the thermal diffusivity, the specific heat capacity, and the bulk density. X-ray diffraction shows the presence of AlN, the phosphor compositions, with no additional phases above the detection limit. An SEM image of a fracture section shows that both types of phosphor particles have been wetted by AlN and that the AlN has formed a porous matrix. The porosity of the disks is measured at 30%. The thermal conductivity is measured as 30 W $m^{-1}$ $K^{-1}$.

Although the above is a full description of specific embodiments, various modifications, alternative constructions and equivalents may be used. Therefore, the above description and illustrations should not be taken as limiting the scope of the present disclosure which is defined by the appended claims.

What is claimed:
1. A method for forming an aluminum-containing nitride ceramic matrix composite, comprising:
   forming at least one green body comprising a phosphor powder and an aluminum-containing composition, wherein
      the at least one green body is characterized by a porosity between about 10% and about 80%, and
      the phosphor powder comprises at least one phosphor composition, and phosphor powder particles have a D50 diameter between about 100 nanometers and about 500 micrometers; and
   heating a sealable container to a temperature between about 400 degrees Celsius and about 800 degrees Celsius and a pressure between about 10 MPa and about 1000 MPa,
   wherein
      the at least one green body, ammonia, and a mineralizer composition are disposed within the sealable container before heating and pressurizing the sealable container,
      the aluminum-containing composition has a purity, on a metals basis, between about 90% and about 99.9999%,
      the fraction of free volume within the sealable container that is filled with liquid ammonia is between about 10% and about 95% before heating and pressurizing the sealable container, and the heating the sealable container comprises heating the sealable container for a first period of time to form the aluminum-containing nitride ceramic matrix composite characterized by a phosphor-to-aluminum nitride (AlN) ratio, by volume, between about 1% and about 99%, by a porosity between about 1% and about 50%, and by a thermal conductivity between about 1 watt per meter-Kelvin and about 320 watts per meter-Kelvin.

2. The method of claim 1, wherein the phosphor composition comprises one or more of $Y_3Al_5O_{12}:Ce^{3+}$, $Lu_3Al_5O_{12}:Ce^{3+}$, $(Y,Gd,Tb,Sc,Lu,La)_3(Al,Ga,In)_5O_{12}:Ce^{3+}$, β-SiAlON:$Eu^{2+}$, α-SiAlON:$Eu^{2+}$, $SrSi_2O_2N_2:Eu^{2+}$, $SrGa_2S_4:Eu^{2+}$, $SrS:Eu^{2+}$, and $CaAlSiN_3:Eu^{2+}$.

3. The method of claim 1, wherein the phosphor powder particles are characterized by the D50 diameter between about 1 micrometer and about 200 micrometers.

4. The method of claim 1, wherein the aluminum-containing composition comprises a coating that is disposed on at least a portion of the green body and has a thickness between about 50 nanometers and about 100 micrometers.

5. The method of claim 1, wherein the aluminum-containing composition further comprises a getter composition, the getter composition comprising one or more of beryllium, magnesium, calcium, strontium, barium, scandium, titanium, vanadium, chromium, yttrium, zirconium, niobium, a rare earth metal, hafnium, tantalum, or tungsten.

6. The method of claim 5, wherein the getter composition comprises one or more of beryllium, magnesium, scandium or yttrium.

7. The method of claim 1, wherein the green body further comprises aluminum-containing particles, the aluminum-containing particles comprising one or more of aluminum nitride powder, aluminum nitride grit, aluminum powder, aluminum flakes, aluminum pellets, aluminum shavings, aluminum grit, or aluminum evaporation slug.

8. The method of claim 7, wherein the aluminum-containing particles are characterized by a maximum dimension between about 1 micrometer and about 10 millimeters.

9. The method of claim 1, further comprising forming the at least one green body by a tape casting, screen printing, or doctor blade technique.

10. The method of claim 9, wherein the tape casting, screen printing, or doctor blade technique further includes the use of a stencil mask.

11. The method of claim 1, wherein the green body is formed by one or more of a granulating, pelleting, or tableting process.

12. The method of claim 1, further comprising:
forming supercritical ammonia in the sealable container while heating the sealable container; and
heating the green body to a temperature above about 600 degrees Celsius prior to exposing the green body to supercritical ammonia.

13. The method of claim 1, wherein the mineralizer composition comprises one or more of Li, Na, K, Rb, Cs, Be, Mg, Ca, Sr, or Ba, or a hydride, amide, imide, amido-imide, nitride, or azide thereof.

14. The method of claim 13, wherein the mineralizer composition comprises at least one of sodium azide and potassium azide.

15. The method of claim 13, wherein the sealable container further comprises a metal composition before heating the sealable container, and the metal composition disposed within the sealable container has a composition and quantity such that a nitrogen gas species is generated by decomposition of an azide mineralizer and a hydrogen gas species is generated by reaction of at least the metal composition with supercritical ammonia that are in a molar ratio of approximately 1:3.

16. The method of claim 1, wherein the mineralizer composition comprises one or more of $NH_4F$, $NH_4Cl$, $NH_4Br$, $NH_4I$, $AlF_3$, $AlCl_3$, $AlBr_3$, $AlI_3$, or any compound that may be formed by reaction of two or more of F, Cl, Br, I, HF, HCl, HBr, HI, Al, AlN, and $NH_3$.

17. The method of claim 1, wherein the aluminum-containing nitride ceramic matrix composite is characterized by a porosity between about 3% and about 20%.

18. The method of claim 1, where in the aluminum-containing nitride ceramic matrix composite is characterized by a thermal conductivity between about 10 watts per meter-Kelvin and about 170 watts per meter-Kelvin.

19. The method of claim 1, wherein the aluminum-containing nitride ceramic matrix composite comprises at least two phosphor compositions.

20. The method of claim 1, wherein the aluminum-containing nitride ceramic matrix composite comprises at least one phosphor composition having an internal quantum efficiency of a least about 30%.

* * * * *